US006813272B1

(12) United States Patent
An et al.

(10) Patent No.: US 6,813,272 B1
(45) Date of Patent: Nov. 2, 2004

(54) QOS-BASED ROUTING METHOD

(75) Inventors: Sun Shin An, Seoul (KR); Young Hyun Yoon, Seoul (KR); Eun Ho Choi, Teajon-shi (KR); Hong Beom Jeon, Taejon-shi (KR); Doo Seok Kim, Taejon-shi (KR)

(73) Assignee: Korea Telecommunication Authority, Kyunggi-Do (KR)

( * ) Notice: Subject to any disclaimer, the term of this patent is extended or adjusted under 35 U.S.C. 154(b) by 883 days.

(21) Appl. No.: 09/595,862

(22) Filed: Jun. 16, 2000

(30) Foreign Application Priority Data

Jun. 23, 1999 (KR) ........................................ 1999-23623
Jun. 30, 1999 (KR) ........................................ 1999-25632

(51) Int. Cl.[7] ............................................. H04L 12/28
(52) U.S. Cl. .................. 370/395.21; 370/237; 370/238; 370/392; 370/408; 370/468
(58) Field of Search ................................. 370/230, 235, 370/238, 395.1, 395.2, 390, 396, 408, 432, 465, 468, 237, 238.1, 395.21, 392

(56) References Cited

U.S. PATENT DOCUMENTS

| 5,831,975 | A | * | 11/1998 | Chen et al. .................. 370/256 |
| 5,831,982 | A | | 11/1998 | Hummel | |
| 5,933,425 | A | * | 8/1999 | Iwata ........................... 370/351 |
| 6,088,333 | A | * | 7/2000 | Yang et al. ................... 370/238 |
| 6,246,669 | B1 | * | 6/2001 | Chevalier et al. ........... 370/238 |
| 6,259,673 | B1 | * | 7/2001 | Yoshihara et al. .......... 370/238 |
| 6,301,244 | B1 | * | 10/2001 | Huang et al. ................ 370/351 |
| 6,377,551 | B1 | * | 4/2002 | Luo et al. .................... 370/238 |
| 6,563,798 | B1 | * | 5/2003 | Cheng ......................... 370/255 |
| 6,594,235 | B1 | * | 7/2003 | Rochberger et al. ........ 370/238 |
| 6,594,268 | B1 | * | 7/2003 | Aukia et al. ................. 370/400 |
| 6,646,989 | B1 | * | 11/2003 | Khotimsky et al. ......... 370/238 |

* cited by examiner

Primary Examiner—Wellington Chin
Assistant Examiner—Kevin Mew
(74) Attorney, Agent, or Firm—Merchant & Gould, P.C.

(57) ABSTRACT

A routing method with routing algorithms applicable to a one-level hierarchical network, including a first algorithm in which a shortest one among all paths established in association with one destination is selected, a second algorithm in which the first method is conducted in a distributed fashion to achieve a fast routing, and a third algorithm in which any one of paths established in association with one destination may be selected as a shortest path when the QoS value calculated in association therewith is more optimum than a required reference QoS value, for preventing problems caused by errors at the single path. The method also provides algorithms that are modified versions of the second and third algorithm for the multi-level hierarchical network. Accordingly, the method is advantageous in that users can select an algorithm, most suitable for the system environment, from the above algorithms.

43 Claims, 17 Drawing Sheets

QOS-BASED ROUTING METHOD

BACKGROUND OF THE INVENTION

1. Field of the Invention

The present invention relates to a routing method providing a requested quality of service, and more particularly to a routing method for establishing a routing based on a specific Quality of Service (QoS) requested in a transmission of multimedia information in various data communication networks.

2. Description of the Prior Art

One of general routing methods is a distance vector algorithm which is mainly used as a routing algorithm in the Internet.

An operation of such a distance vector algorithm will be described in brief hereinafter. In accordance with the distance vector algorithm, each of nodes linked to one of networks communicating together initializes the distance value associated therewith to be 0 (zero) while initializing respective distance values of the remaining nodes linked to the network to be infinite. In this state, a routing procedure is conducted for every node in order to find the shortest distance between the node and each of the remaining nodes. The shortest distances found for all nodes are registered in a routing table N. The following expression is an expression for deriving a shortest distance between two nodes:

$$D(v) \leftarrow \text{Min}[(D(v), D(\omega)+L(\omega,v))]$$

where, "D(v)" represents the distance between an origin node, namely, a current node, and a destination node, and "L(ω,v)" represents the distance between a node ω and a node v.

Information about the shortest distance derived for each node is transmitted to all nodes adjacent thereto. This procedure is repeated for each node until the node completely collects the entire shortest distance information associated with all nodes linked thereto.

Where no further information about path change is generated from any node and where there is no further information, being transmitted, in links connecting nodes, the path information collection procedure is completed because that condition corresponds to a complete collection of the entire shortest distance information.

The above mentioned distance vector algorithm provides an important advantage in that it is simple. As apparent from the above procedures, this algorithm can be easily implemented because it is very simple.

However, the distance vector algorithm has disadvantages in that it takes a relatively extended period of time and consumes a relatively increased quantity of network bandwidth because each node should collect information about all paths associated therewith. There is a more serious disadvantage in that a ping-pong phenomenon may occur. That is, information changed in each node in an environment involving a frequent change in network state and transmitted from each node to adjacent nodes may be returned to the node. Furthermore, intermediate nodes have no function for determining an optimum QoS.

Another routing method is a link-state algorithm. This link-state algorithm is a routing algorithm also called a "Shortest Path First" algorithm. The link-state algorithm is provided with a distributed data based model while using a "Dijkstra's Shortest Path" algorithm in order to determine a shortest path.

An operation of such a link-state algorithm will be described in brief hereinafter. In accordance with the link-state algorithm, each local node supplies the current link state thereof to other nodes. The status information of each node includes information about an interface, being in operation, of the node, transmission time taken to transmit information via the interface, and destinations to which the interface is connected.

The state information of each node is transmitted to other nodes using a flooding function. Each node receives such information from other nodes and stores the received information in its link-state database.

Using the stored information, each node determines the shortest distance path between the node and each of other nodes in accordance with the "Dijkstra's Shortest Path" algorithm and stores it in its routing table.

However, the link-state algorithm has a disadvantage in that it is complex, as compared to the distance vector algorithm. There is another disadvantage in that a large quantity of bandwidth is consumed because link state information should be periodically supplied.

In accordance with the above mentioned link-state algorithm, an optimum path is initially established, based on all routing information completely collected. For this reason, when different nodes request different multimedia services, respectively, it is impossible to provide a variety of QoS meeting about the requested multimedia services because all link states and all distance vectors have been fixedly set in association with the optimum paths initially established for those nodes, so that they may be unsuitable.

For another routing method, there is a Dynamic Source Routing (DSR) algorithm. This DSR algorithm is an algorithm proposed by the "MANET" group of Internet Engineering Task Force (IETF). The DSR algorithm is not a general routing algorithm used in cable and radio environments, but a routing algorithm for "ad-hoc" networks, that is, specific radio mobile networks in which no base station exists. In this algorithm, any provision of QoS is not taken into consideration in association with multimedia services.

Such a DSR algorithm will be described in brief hereinafter. In accordance with the DSR algorithm, a source node, which requests transmission of data, forwards a request for setting of routing to all nodes adjacent thereto toward a destination node.

Each intermediate node, which receives routing setting requests respectively transmitted from other intermediate nodes, but being the same as that originally transmitted from the source node, forwards only the routing setting request, first-arrived thereto, toward the destination node while rejecting the remaining routing setting requests arriving later so as to avoid their transmission toward the destination node.

The routing setting request arriving to the destination node is returned to the source node along with a list of intermediate nodes through which the routing setting request was passed during the transmission thereof to the destination node. Thus, the shortest path between the source and destination nodes is established. In this state, all data packets to be transmitted contains information about the list of the intermediate nodes through which the packets are to pass. Accordingly, the data packets are transmitted in accordance with an order determined by the intermediate node list.

However, the above mentioned DSR algorithm has a disadvantage in that it can operate only in a specific network environment, that is, the "ad-hoc" radio network. Since the DSR algorithm is configured to always transmit packets along a path involving the shortest time delay, there is also a disadvantage in that no consideration for multimedia services is made.

In order to implement a routing algorithm capable of providing multimedia services in cable and radio networks, the following factors should be taken into consideration.

First, the most important problem involved in design of a routing algorithm for multimedia services is that an optimum path meeting all parameters cannot exist in accordance with conventional techniques even though at least one optimum path meeting each of those parameters may exist. Where two parameters, for example, bandwidth and time delay, are taken into consideration for a routing, the optimum path for bandwidth and the optimum path for time delay are different from each other in most cases. Therefore, it is necessary to provide a decisive protocol for determining whether or not a path established is optimum for a desired QoS, in association with a routing providing QoS.

Second, there is another problem in that mobile terminals operating in radio networks are frequently movable. Such mobile terminals frequently change the topology of the network while moving. For this reason, static routing methods are unsuitable in which a communication path is established prior to a request for a routing. Therefore, adaptive routing protocols should be taken into consideration.

Third, terminals operating in radio networks have a reduced memory space and a reduced computation ability, as compared to routers operating in cable networks. For this reason, routing protocols requiring a complex computation are unsuitable. Therefore, simple routing protocols are necessary.

Fourth, terminals operating in radio networks should run a distributed routing protocol operable in distributed environments. In the case of a protocol, in which a path is established for a routing by a central node in a radio network environment, frequent changes of data occur due to the frequent-movement characteristics of the radio terminals. It is also necessary to use terminal routing information at intervals of time for a maintenance of changed data. This results in an increased consumption of network bandwidth. For this reason, the above mentioned protocol is unsuitable in radio network environments. Consequently, for radio mobile communications, it is necessary to provide a distributed routing protocol in which routers operate to maintain and manage a minimum quantity of information required for a routing.

SUMMARY OF THE INVENTION

Therefore, the present invention has been made in view of the above mentioned problems involved in the prior art, and an object of the invention is to provide a QoS-based optimum routing method capable of providing QOS for multimedia services in general cable and radio networks.

Another object of the invention is to provide a routing method for providing route information about nodes passed between a source node and a destination node to those nodes in order to prevent re-transmission of the route information to nodes already passed, thereby preventing a waste of CPU capacity and bandwidth.

Another object of the invention is to provide a routing method capable of achieving a reduction in routing time.

Another object of the invention is to provide a routing method capable of using various route information arrived at a destination node to establish a back-up path or a multi-path for an increase in transmission rate.

Another object of the invention is to provide a routing method for providing efficient data services in an ATM-based multi-level hierarchical network.

In accordance with one aspect, the present invention provides a routing method in a data communication network for selecting the shortest path among a plurality of paths established between a single source node and a single destination node comprising the steps of: (A) initializing a set of information about links of nodes in all paths existing in the network and Quality of Service (QoS) values for the links; and (B) designating a routing start point after completion of the initialization, and executing a routing process from the designated routing start point.

In accordance with another aspect, the present invention provides a routing method in a data communication network for selecting the shortest path among a plurality of paths established between a single source node and a single destination node comprising the steps of: (A) initializing a set of information about links of nodes in all paths existing in the network and Quality of Service (QoS) values for the links; (B) designating a routing start point after completion of the initialization, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made.

In accordance with another aspect, the present invention provides a routing method in a data communication network for selecting paths satisfying a reference Quality of Service (QoS) value among a plurality of paths established between a single source node and a single destination node comprising the steps of: (A) initializing a set of information about links of nodes in all paths existing in the network and QoS values for the links; (B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made.

In accordance with another aspect, the present invention provides a routing method in a multi-level hierarchical data communication network having a plurality of layers for selecting the shortest path among a plurality of paths established between a single source node and a single destination node comprising the steps of: (A) initializing a set of information about links of nodes in all paths existing in the network and Quality of Service (QoS) values for the links; (B) designating a routing start point after completion of the initialization, calling a routing means to execute a distributed routing process from the designated routing start point, and waiting for a routing message from the routing means responding to the call; and (C) controlling the routing means to execute the routing process in response to the call in such a fashion that those of the layers once routed are not routed again, and to transmit the routing message to the routing start point from which the call is made.

In accordance with another aspect, the present invention provides a routing method in a multi-level hierarchical data communication network having a plurality of layers for selecting paths satisfying a reference Quality of Service (QoS) value among a plurality of paths established between a single source node and a single destination node comprising the steps of: (A) initializing a set of information about links of nodes in all paths existing in the network and QoS values for the links; (B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made.

In accordance with another aspect, the present invention provides a routing method in a data communication network for selecting the shortest path among a plurality of paths established between a single source node and each of destination nodes for multicasting comprising the steps of: (A) initializing a set of information about links of nodes in all paths existing in the network and Quality of Service (QoS) values for the links; (B) designating a routing start point after completion of the initialization, calling a multi-casting routing means to execute a distributed routing process from the designated routing start point, and waiting for a routing message from the multi-casting routing means responding to the call; and (C) controlling the multi-casting routing means to execute the routing process in response to the call, and to transmit the routing message to the routing start point from which the call is made.

In accordance with another aspect, the present invention provides a routing method in a data communication network for selecting paths satisfying a reference Quality of Service (QoS) value among a plurality of paths established between a single source node and a single destination node comprising the steps of: (A) initializing a set of information about links of nodes in all paths existing in the network and QoS values for the links; (B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made.

In accordance with another aspect, the present invention provides a routing method in a multi-level hierarchical data communication network having a plurality of layers for selecting the shortest path among a plurality of paths established between a single source node and each of destination nodes comprising the steps of: (A) initializing a set of information about links of nodes in all paths existing in the network and Quality of Service (QoS) values for the links; (B) designating a routing start point after completion of the initialization, calling a multi-casting routing means to execute a distributed routing process from the designated routing start point, and waiting for a routing message from the multi-casting routing means responding to the call; and (C) controlling the multio-casting routing means to execute the routing process in response to the call in such a fashion that those of the layers once routed are not routed again, and to transmit the routing message to the routing start point from which the call is made.

In accordance with another aspect, the present invention provides a routing method in a multi-level hierarchical data communication network having a plurality of layers for selecting paths satisfying a reference Quality of Service (QoS) value among a plurality of paths established between a single source node and a single destination node comprising the steps of: (A) initializing a set of information about links of nodes in all paths existing in the network and QoS values for the links; (B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Hereinafter, a preferred embodiment of the present invention will be described in detail, in conjunction with the annexed drawings.

Figure 1:
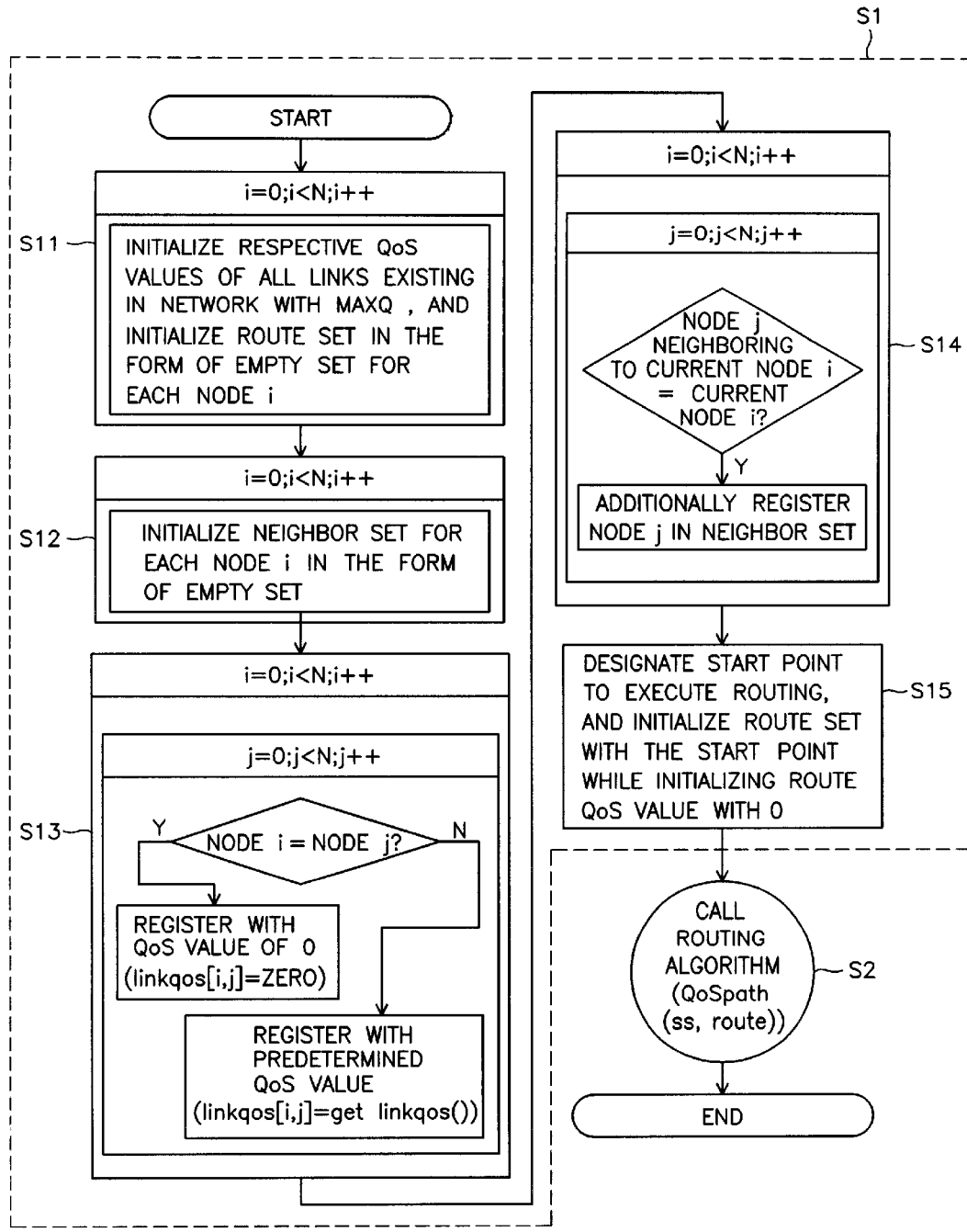
FIG. 1 is a flow chart illustrating a Generic Shortest Path Algorithm (GSPA) according to a first embodiment of the present invention.

FIG. 1 is a flow chart illustrating a Generic Shortest Path Algorithm (GSPA) according to a first embodiment of the present invention. The GSPA involves an initialization procedure S1 for initializing a set of information about links of nodes in all paths existing in a network and QoS values for those links, and a routing procedure S2 for designating a routing start point after completion of the initialization, and executing a routing process from the designated routing start point, thereby determining an optimum path.

First, the initialization procedure S1 of the GSPA will be described. In the initialization procedure S1, respective QoS values of all links existing in the network, is initialized with a predetermined maximum value "MAXQ" using a repetitive paragraph for each node i (i=0 to N) The maximum QoS value MAXQ is indicative of the fact that no path reaching the node i is found.

A set of information about the shortest path, that is, a route set, is also initialized in the form of an empty set {@} for each node i (Step S11). The shortest path for the node i is established from a source node to the node i. The route set for the node i contains information about nodes linked between the source node and the node i along the shortest path, and a total value of QoSs accumulated at the node i along the shortest path for the node i.

For reference, the algorithm and parameters used are defined as follows:

struct{Qos tqos; Oset set;} node[N]; /* node information*./
Oset neighbor_set[N];/*ordered neighbor set of a node*/
Qos linkqos[N, N];/*Qos information between nodes*/
  Typedef struct {QoS tqos; Oset set;} Route;
  Main(int ss)/*source number*/
  {
  int i,j; Route route;
    for(i=0; i<N; i++){node[i].tqos=MAXQ; node[i].set= {@};}

Thereafter, a set of information about neighbor nodes linked to each node i, that is, a neighbor set, is initialized. The initialization of the neighbor set is also carried out using a repetitive paragraph so that the set is initialized in the form of an empty set (Step S12).

For this initialization, the following algorithm may be used:

for(i=0; i<N; i++)neighbor_set[i]={@};/*{@}; empty set*/

Subsequently, links associated with each node i are determined along with respective QoS values of those links in order to construct a neighbor set for the node i (Step S13). This determination is executed for all nodes existing in the network using a repetitive paragraph. For the QoS value determination, it is first determined whether or not the node i and a node j neighboring to the node i are the same. When the nodes i and j are different from each other, a predetermined QoS value is used. On the other hand, when the nodes i and j are the same, a QoS value of 0 is used.

For this determination, the following algorithm may be used:

for (i=0; i<N; i++) for (j=0; j<N; j++){
  if (i==j)linkqos[i,j]=ZERO else linkqos [i,j]=getlinkqos ( );
  }/*connected: QoS value, disconnected: MAXQ*/

Using the links and link QoS values determined for each node i as mentioned above, a neighbor set for the node i is then constructed. The construction of the neighbor set is executed for all nodes using a repetitive paragraph.

That is, when a node j neighboring to the current node i is not the same as the current node i while being linked to the current node, it is additionally registered in the neighbor set (Step S14).

This may be executed using the following algorithm:

for (i=0; i<N; i++) for (j=0; j<N; j++){
  if (linkqos[i, j]!=ZERO && linkqos[i, j]!=MAXQ)
    neighbor_set[i]=neighbor_set[i] ∪ j;
  }/*neighbor set construction, ∪: ∪ordered set union*/

Thereafter, a start point is designated to execute a routing for the shortest path from the designated start point. The route set is initialized with the start point. The route QoS value is also initialized with a value of 0 so that a routing is begun (Step S15).

After completion of all the above mentioned initialization processes, a routing algorithm is called to execute a routing starting from the routing start point (Step S2).

This is executed using the following algorithm:

route.set={ss}; route.tqos=ZERO;
QoSpath(ss, route)

Figure 2:
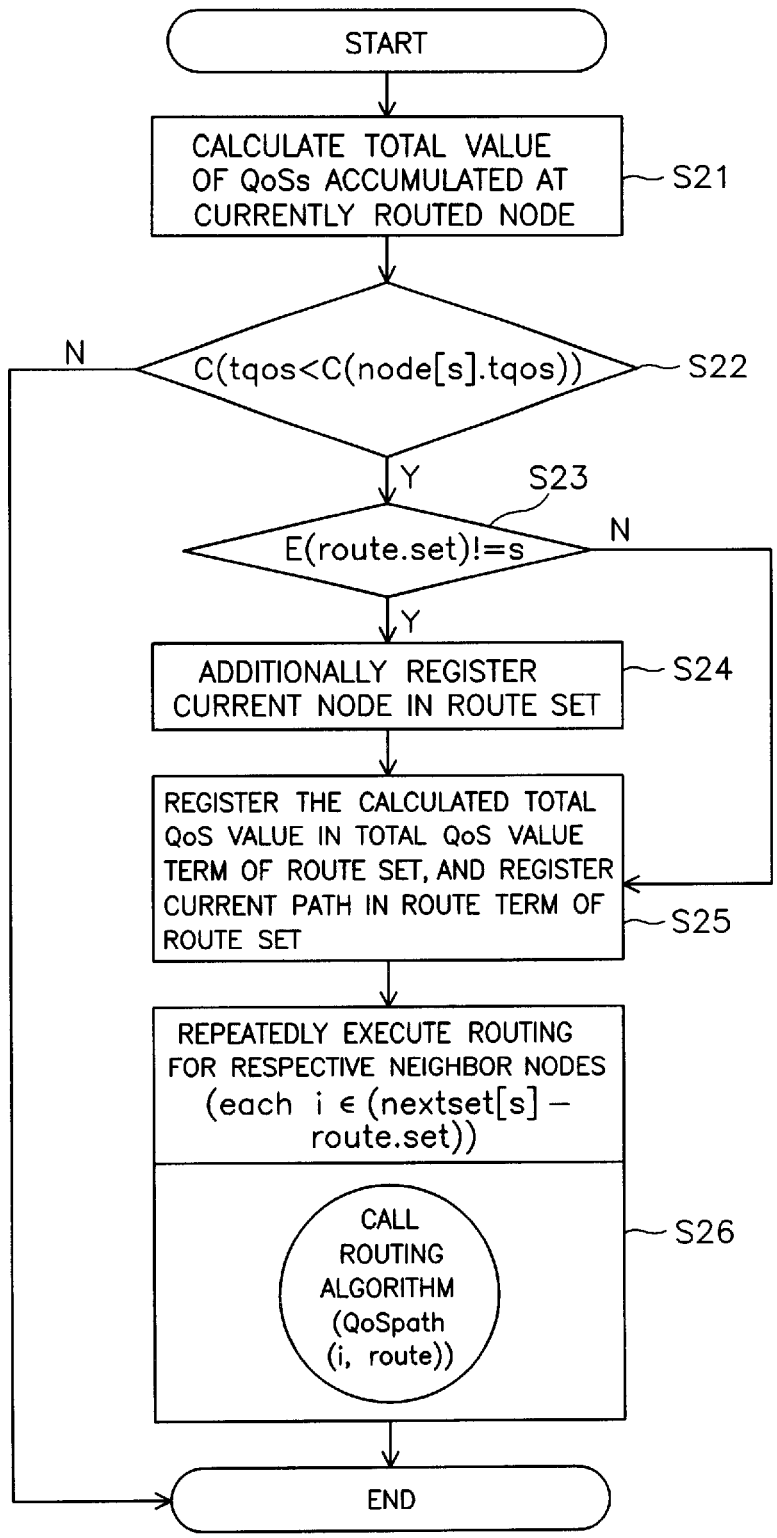
FIG. 2 is a flow chart illustrating the routing procedure of FIG. 1 in detail.

FIG. 2 is a flow chart illustrating the routing procedure S2 for determining an optimum path in accordance with a routing algorithm "QoSpath(ss, route)" operating in response to the above mentioned calling. In the routing procedure S2, the total value of QoSs accumulated at the node currently routed is first calculated (Step S21).

For reference, the algorithm and parameters used are defined as follows:

QoSpath(int s, Route route)
{
Qos tqos;
int i;
tqos=F(route.tqos, linkQos[E(route.set), s]);

The function "E( )" is used to find the last one of the nodes included in the route set associated with a path used as a factor. On the other hand, the function "F( )" is used to determine the QoS value of the path including two nodes, used as a factor, based on the QoS value between those nodes. Accordingly, the total QoS value of the current path including the current node can be determined by finding the current node and the node just previous to the current node in accordance with the function "E( )", and then calculating the QoS value between the current and previous nodes in accordance with the function.

The currently calculated total QoS value is then compared with the previously calculated total value of QoSs accumulated at the currently routed node along another path. Such a comparison is necessary because there are a plurality of paths reaching the current node. Where the previous total QoS value is more optimum than the current total QoS value, the current routing is stopped. The procedure then waits for another routing call [C(tqos)<C(node[s].tqos)] (Step S22).

On the other hand, where the current total QoS value is more optimum than the previous total QoS value, a correction of routing information should be made, based on the current path, because the current path is less optimum than the previous path. In this case, accordingly, it is determined whether or not the last node of the current path corresponds to the current node [E(route.set)!=] (Step S23).

Where the last node of the current path does not correspond to the current node, this node is additionally registered in the route set (Step S24). The procedure then proceeds to step S25.

On the other hand, where the last node of the current path corresponds to the current node, step S24 is omitted. In this case, the total value of route QoSs accumulated at the current node along the current path is directly calculated. The reason why step S24 is omitted is because an addition of link information in this case results in a duplication of the current node.

At step S25, the total QoS value calculated at step S21 is registered in the total QoS value term of the route set, and the current path is registered in the route term of the route set. That is, the route set is updated using the current path and the total QoS value of the current path.

This may be executed using the following algorithm:

if (C(tqos)<C(node[s].tqos)){/*C: cost function for given Qos*/
   if (E(route.set)!=s)route.set=route.set ∪ s;
   route.tqos=tqos;
   node[s].set=route.set;

After completion of the above procedure, that is, after the determination of the optimum path for the currently called node is completed, steps S21 to S25 are repeatedly executed using a repetitive paragraph for a determination of an optimum path for each neighbor node linked to the current path.

Similar to the above mentioned case, this routing is executed, starting from a calling of the above mentioned routing algorithm. In particular, the routing in this case for each node linked to the path previously routed is begun after subtracting the route set of the previously routed node from the neighbor set of the same node in order to avoid a repeated routing for the path already routed (Step S26).

This may be executed using the following algorithm:

for (each i∈(neighbor_set[s]−route.set)) QoSpath(i, route);

Although the routing is begun after subtracting the route set of the previously routed node from the neighbor set of the same node in accordance with the above mentioned method, the algorithm of the present invention may be configured to give a shortest path when the loop value has a positive value in the meaning of the cost function.

Figure 3:
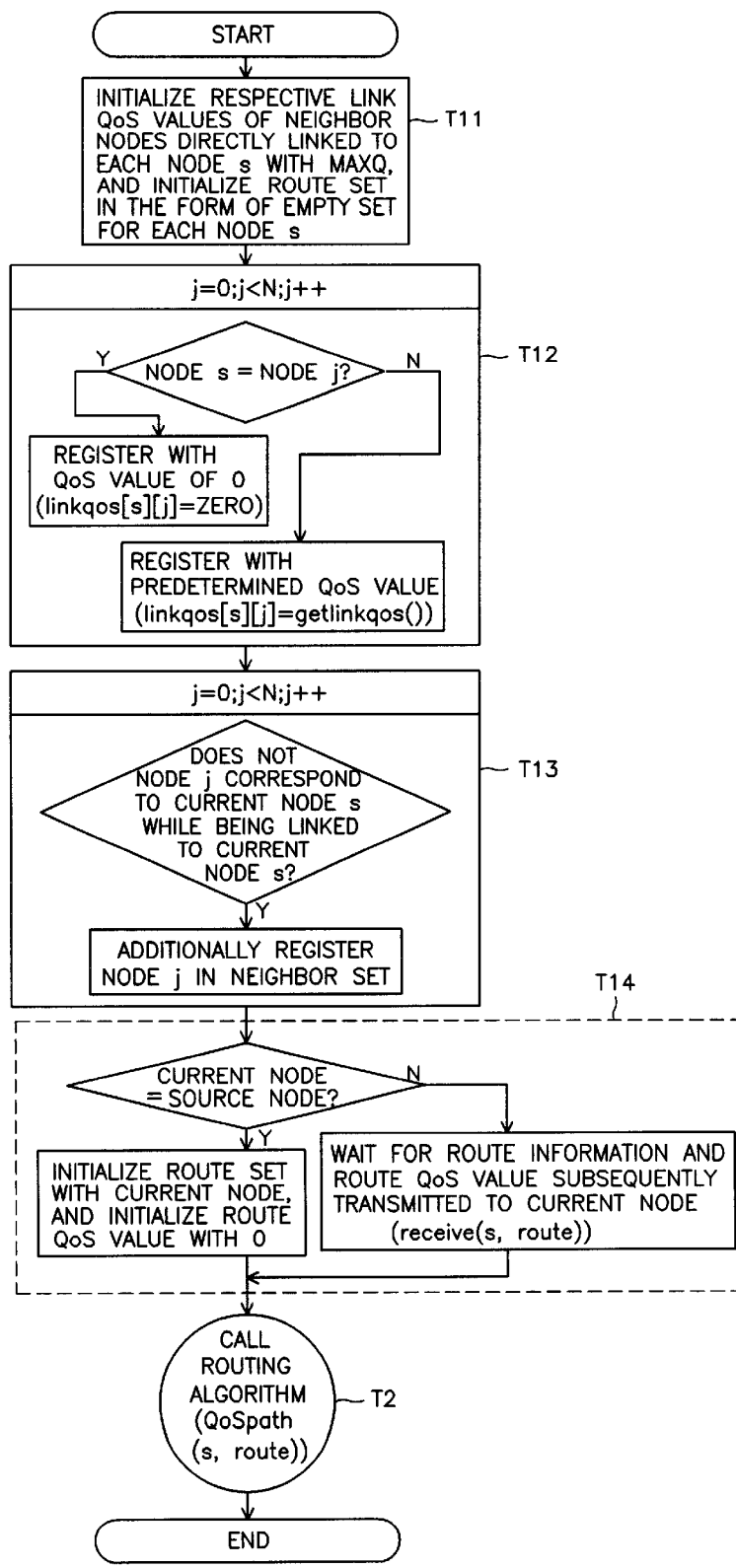
FIG. 3 is a flow chart illustrating a Distributed Generic Shortest Path Algorithm (DGSPA) in accordance with a second embodiment of the present invention.

FIG. 3 is a flow chart illustrating a routing algorithm for determining an optimum path in accordance with another embodiment of the present invention. This routing algorithm is a Distributed Generic Shortest Path Algorithm (DGSPA). This algorithm is different from the above mentioned GSPA in that it executes a routing only for neighboring nodes linked to each other without executing the routing for all nodes existing in the network.

In accordance with the DGSPA, a routing is executed for only one path when only an optimum one of route messages reaching the destination node is selected. However, when all paths meeting a requested QoS are selected, a multi-routing is executed.

The DGSPA of FIG. 3 involves an initialization procedure T1 for initializing a set of information about neighbor nodes directly linked to an optional node and QoS values for links each connected between the optional node and an associated one of those neighbor nodes, and a routing procedure T2 for waiting for a call associated with an execution of a routing process after completion of the initialization, and executing the routing process in response to the call.

First, the initialization procedure T1 of the DGSPA will be described. In the initialization procedure T1, respective link QoS values of neighbor nodes directly linked to each node s existing in the network, is initialized with a predetermined maximum value "MAXQ". The maximum QoS value MAXQ is indicative of the fact that no path linked to the node i is found. Also, information about the optional node s and information about neighbor nodes directly linked to the node s are initialized in the form of empty sets, respectively (T11).

For reference, the algorithm and parameters used are defined as follows:

Typedef struct{Qos tqos; Oset set;}Route;
struct{Qos tqos; Oset set;}node[s];
Oset neighbor_set[s];
Qos linkqos[s][N];
Route route; node[s].tqos=MAXQ;
node[s].set={@};
neighbor_set[s]={@};

Subsequently, links associated with each node s are determined along with respective QoS values of those links in order to construct a neighbor set for the node i (Step T12). This determination is executed for all nodes existing in the network using a repetitive paragraph. For the QoS value determination, it is first determined whether or not the node s and a node j neighboring to the node s are the same. When the nodes s and j are different from each other, a predetermined QoS value is used. On the other hand, when the nodes s and j are the same, a QoS value of 0 is used.

For this initialization, the following algorithm may be used:

for (j=0; j<N; j++){
  if (s==j)
    linkqos[s][j]=ZERO;
  else
    linkqos[s][j]=getlinkqos( );
}

Using the links and link QoS values determined for each node s as mentioned above, a neighbor set for the node s is then constructed. The construction of the neighbor set is executed for all nodes using a repetitive paragraph.

That is, when a node j neighboring to the current node s is not the same as the current node s while being linked to the current node s, it is additionally registered in the neighbor set (Step T13).

This may be executed using the following algorithm:

```
for (j=0; j<N; j++){
  if (linkqos[s][j]!=ZERO && linkqos[s][j]!=MAXQ)
    neighbor_set[s]=neighbor_set[s] ∪ j;
}
/*connected: QoS value, disconnected: MAXQ,
neighbor_set[s]: neighbor set of s*/
```

After completion of all the above mentioned initialization processes, a routing algorithm is begun. It is determined whether or not the current node corresponds to the source node. Where the current node corresponds to the source node, the route set is initialized with the current node. In this case, the route QoS value is also initialized with a value of 0. In this state, the routing algorithm is called for an execution thereof [QoSpath(s, route)].

Where the current node does not correspond to the source node, the procedure waits for route information and a route QoS value subsequently transmitted to the current node during a routing executed in association with a node other than the current node. In response to reception of those values, the routing algorithm is called [QoSpath(s, route)] (Steps T14 and T2).

This procedure may be executed using the following algorithm:

```
if (s is the source node){
  route.set={s};
  route.tqos=ZERO;
}
else {
  receive (s, Qospath(s, route));
  call (Qospath(s, route));
}
```

Figure 4:
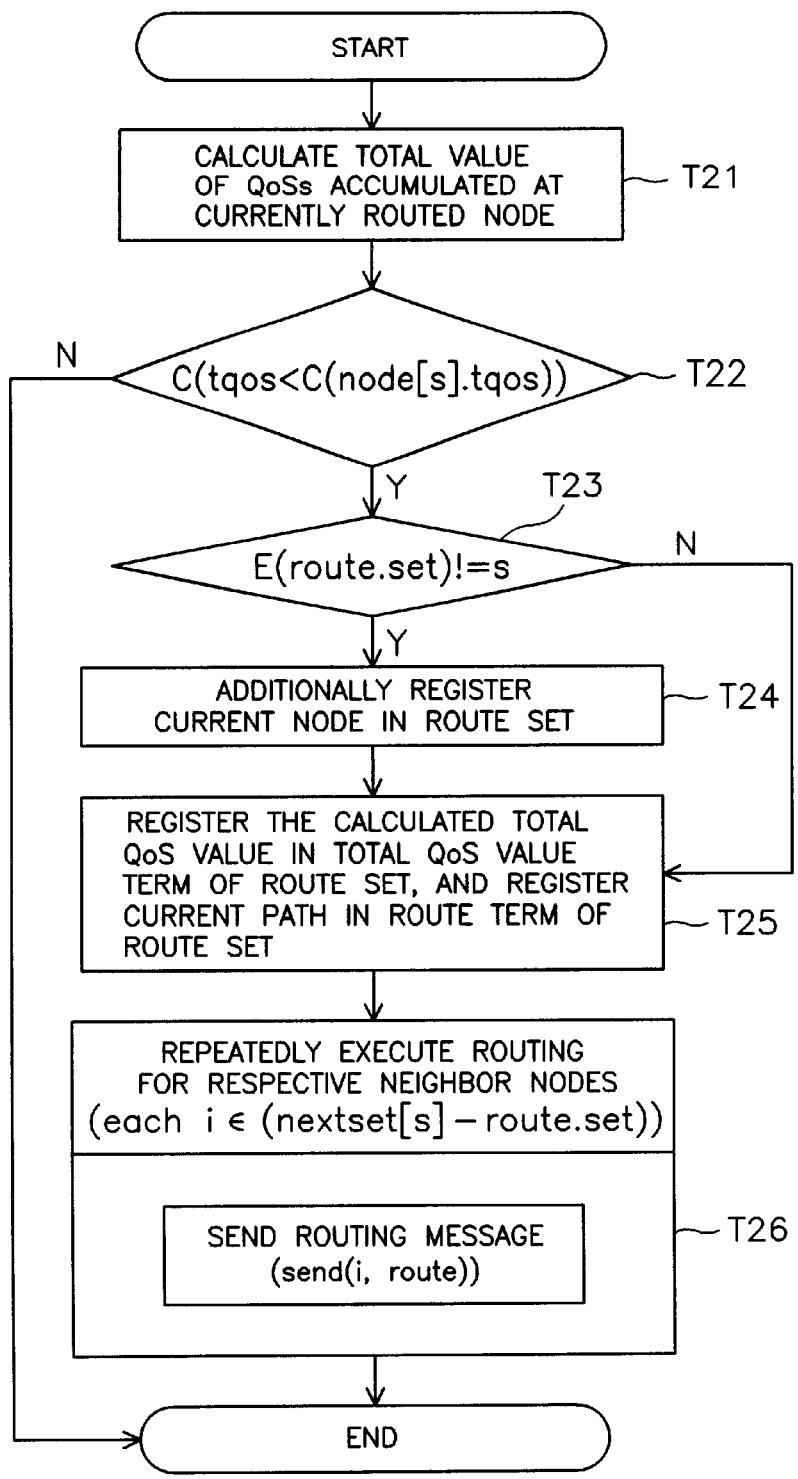
FIG. 4 is a flow chart illustrating the routing procedure of FIG. 3 in detail.

FIG. 4 is a flow chart illustrating the routing procedure T2 for determining an optimum path in accordance with the routing algorithm "Qospath(int s, Route route)" operating in response to the above mentioned calling. In the routing procedure T2, the total value of QoSs accumulated at the node currently routed is first calculated (Step T21).

For reference, the algorithm and parameters used are defined as follows:

```
Qospath(int s, Route route)
{
Qos tqos;
int i;
tqos=F(route.tqos, linkqos[E(route.set), s]);
```

The currently calculated total QoS value is then compared with the previously calculated total value of QoSs accumulated at the currently routed node along another path. Such a comparison is necessary because there are a plurality of paths reaching the current node. Where the previous total QoS value is more optimum than the current total QoS value, the current routing is stopped. The procedure then waits for another routing call (Step T22).

On the other hand, where the current total QoS value is more optimum than the previous total QoS value, a correction of routing information should be made, based on the current path, because the current path is less optimum than the previous path. In this case, accordingly, it is determined whether or not the last node of the current path corresponds to the current node (Step T23).

Where the last node of the current path does not correspond to the current node, this node is additionally registered in the route set (Step T24). The procedure then proceeds to step T25.

On the other hand, where the last node of the current path corresponds to the current node, step T24 is omitted. In this case, the total value of route QoSs accumulated at the current node along the current path is directly calculated. The reason why step T24 is omitted is because an addition of link information in this case results in a duplication of the current node.

At step T25, the total QoS value calculated at step T21 is registered in the total QoS value term of the route set, and the current path is registered in the route term of the route set. That is, the route set is updated using the current path and the total QoS value of the current path.

This may be executed using the following algorithm:

```
if (C(tqos)<C(node[s].tqos)){/*C: cost function for given QoS*/
  if (E(route.set)!=s)route.set=route.set ∪ s;
  route.tqos=tqos;
  node[s].set=route.set;
}
```

After completion of the above procedure, that is, completion of the routing for determining an optimum path for the called node, a routing message is sent to nodes neighboring to the current node [send(i, route)]. This message is transmitted to the call receiving step T14 involved in the initialization procedure T1. In response to a calling executed in accordance with the transmission of the message, steps T21 to T25 are repeatedly executed.

In particular, where the routing algorithm is repeatedly executed in response to the calling, the routing for each node linked to the path previously routed is begun after subtracting the route set of the previously routed node from the neighbor set of the same node in order to avoid a repeated routing for the path already routed (Step T26).

This may be executed using the following algorithm:

```
for (each i∈(neighbor_set[s]-route.set))
  send (i, route);
```

Figure 5:
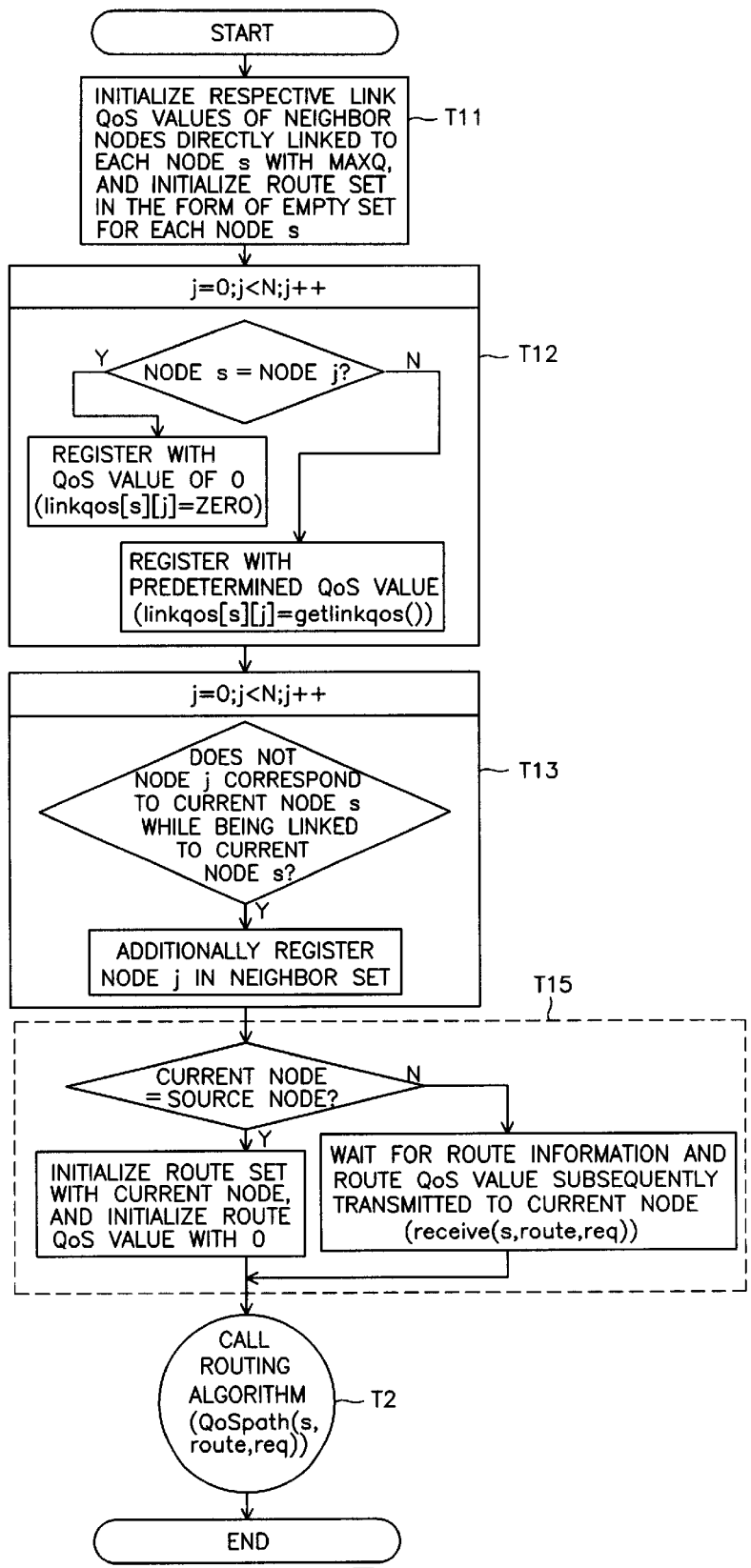
FIG. 5 is a flow chart illustrating a QoS Restricted Generic Shortest Path Algorithm (QRDGSPA) in accordance with a third embodiment of the present invention.

FIG. 5 is a flow chart illustrating a routing algorithm for determining an optimum path in accordance with another embodiment of the present invention. This routing algorithm is a QoS Restricted Generic Shortest Path Algorithm (QRDGSPA). This algorithm is different from the above-mentioned GSPA as follows.

The GSPA illustrated in FIG. 1 is a method in which the shortest one of paths reaching a destination is selected.

That is, in accordance with the GSPA, the total QoS value calculated in association with the current path is compared with the total QoS value previously calculated in association with a path other than the current path in the cost comparison procedure. When the current total QoS value is more optimum than the previous total QoS value, the previous path is deleted, and the current path is set as the shortest path. In such a fashion, only one path is established.

However, in accordance with the QRDGSPA, a reference QoS value is set in the cost comparison procedure.

For example, a particular function should be used in accordance with the QoS factor to be referenced. To this end, the calculation according to the function "F( )" should be made on the basis of the QoS factor to be referenced. In order to achieve a routing for multimedia services, each node typically use the following rules associated with an evaluation of the QoS factor to be referenced.

Additive rule: This rule is adapted to evaluate a QoS factor such as transmission delay, delay jitter, or transmission costs. This rule is expressed as follows:

$$d(p)=d(i,j)+d(j,k)+\ldots+d(l,m)$$

Multiplicative rule: This rule is used for a QoS factor evaluation as expressed as follows:

$$d(p)=d(i,j)\times d(j,k)\times\ldots\times d(l,m)$$

Concave rule: This rule is adapted to evaluate a QoS factor such as bandwidth for data transmission. This rule is expressed as follows:

$$d(p)=\min[(d(i,j), d(j,k), \ldots, d(l,m))$$

Composition rule: This rule is adapted to evaluate a QoS factor such as transmission failure probability. This rule is expressed as follows:

$$d(p)=1-(1-d(i,j))\times(1-d(j,k))\times\ldots\times(1-d(l,m))$$

Any path may be set as a shortest path when the QoS value calculated in association therewith is more optimum than the set reference QoS value. Accordingly, in this case, at least one shortest path may exist.

That is, where there are several paths reaching one destination determined, all of them may be selected as a shortest path in so far as their QoS values meet the above mentioned QoS value condition.

Although the routing process executed along a single shortest path in accordance with the GSPA may proceed no longer when an error is generated at the single path, the QRDGSPA can avoid such a problem.

The algorithm of FIG. 5 is substantially similar to that of FIG. 3, except that a calling factor is additionally used at steps of calling a routing algorithm and receiving the result. This calling factor corresponds to the above mentioned reference QoS value.

That is, "receive(s, route)" in the algorithm of FIG. 3 is changed into "receive(s, route, req)" in the algorithm of FIG. 5.

No description will be made in association with the remaining algorithm of FIG. 5 because it is the same as that of FIG. 3.

Figure 6:
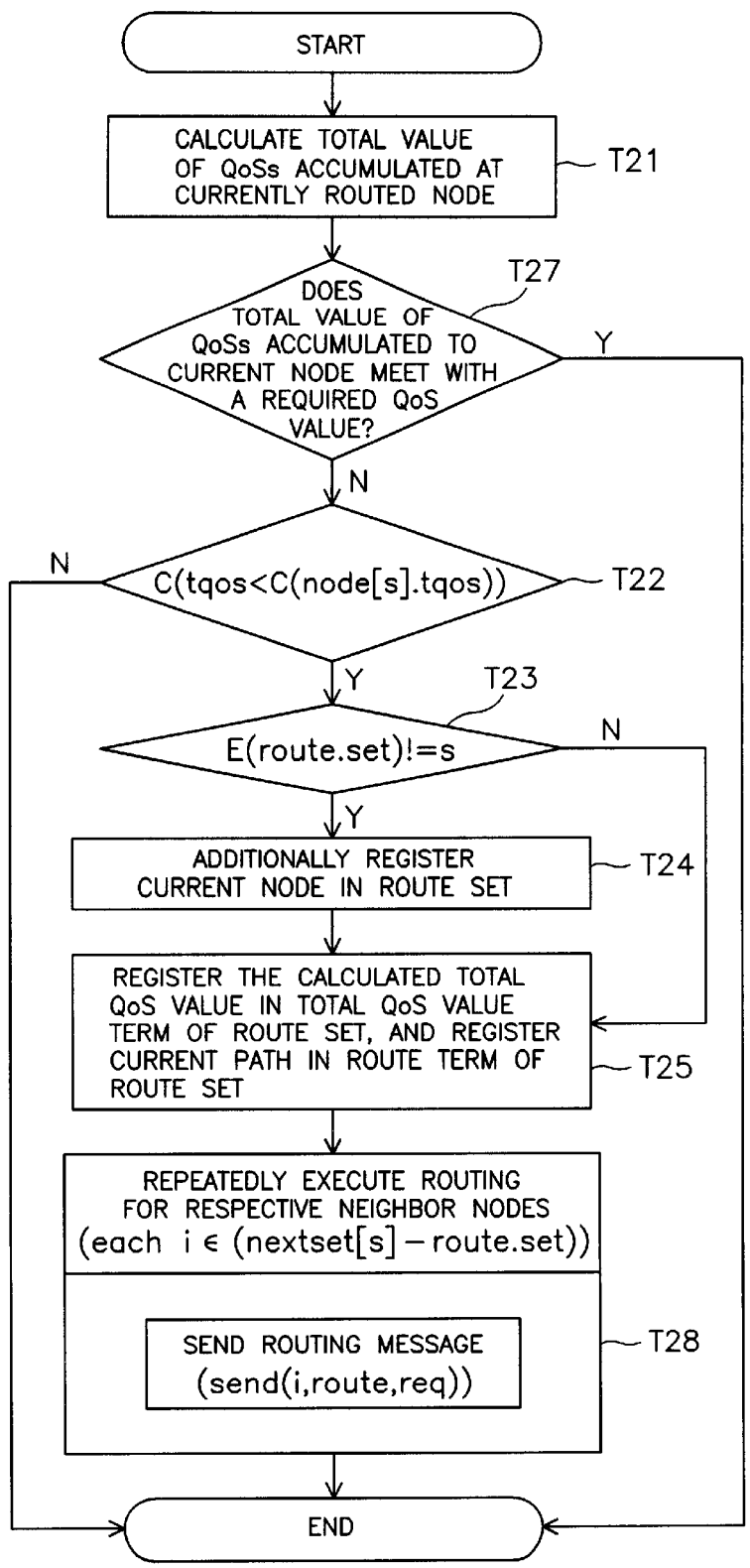
FIG. 6 is a flow chart illustrating the routing procedure of FIG. 5 in detail.

FIG. 6 is a flow chart illustrating a routing algorithm called in the QRDGSPA. This routing algorithm additionally involves the following procedure after the calculation of the total QoS value executed in the procedure T1 of the routing algorithm illustrated in FIG. 4, as compared to the routing algorithm of FIG. 4.

That is, the routing algorithm of FIG. 6 additionally involves a procedure for determining whether or not the total value of QoSs accumulated from the source node to the current node meets with a required QoS value set as the reference value. If the total QoS value meets with the required reference QoS value, the routing algorithm is further executed. If not, the routing algorithm is ended [S(tqos, req)==FALSE] (Step T27).

At the final step of the routing algorithm, transmission of a routing message is executed in order for a repeated execution of the routing algorithm (Step T28).

Since the remaining algorithm of FIG. 6 is the same as that of FIG. 4, no description thereof will be made.

All the above mentioned algorithms are associated with a routing procedure applied to a one level hierarchical network. Hereinafter, a routing procedure applied to a two level hierarchical network will be described.

For a routing procedure applied to a two level hierarchical network, the address of the two level hierarchical network is first defined by two integers [n, m].

Here, "n" represents a higher address whereas "m" represents a lower address.

A set of nodes assigned with the same higher address is defined as a "region". In particular, in this two level hierarchical network, link address lists cannot have address groups having the same higher address while being separated from each other by an address or an address group having a higher address different therefrom.

In other words, a node link, which leaves a region after passing through that region, cannot enter again that region.

For example, a routing address list of [1,2][1,4][1,3][3,1] [3,2][3,3][2,1][2,2] is suitable for an address list for a hierarchical routing. However, a routing address list of [1,2][1,4][1,3][3,1][2,1][3,2][3,3][2,2] is not unsuitable for an address list for a hierarchical routing because the address groups having the same higher address of "3" are separated from each other by an address having a higher address of "2" different from that of the address groups.

In the latter case, a node link is made which leaves a region corresponding to the higher address of "3" (that is, the region 3) after passing through the region 3, and then enters the region 3 at a node [3,2] after passing through a node [2,1]. That is, the node link conflicts with the condition in which it cannot enter a region after leaving that region.

Now, a routing method in the two level hierarchical network in accordance with the present invention will be described.

Figure 7:
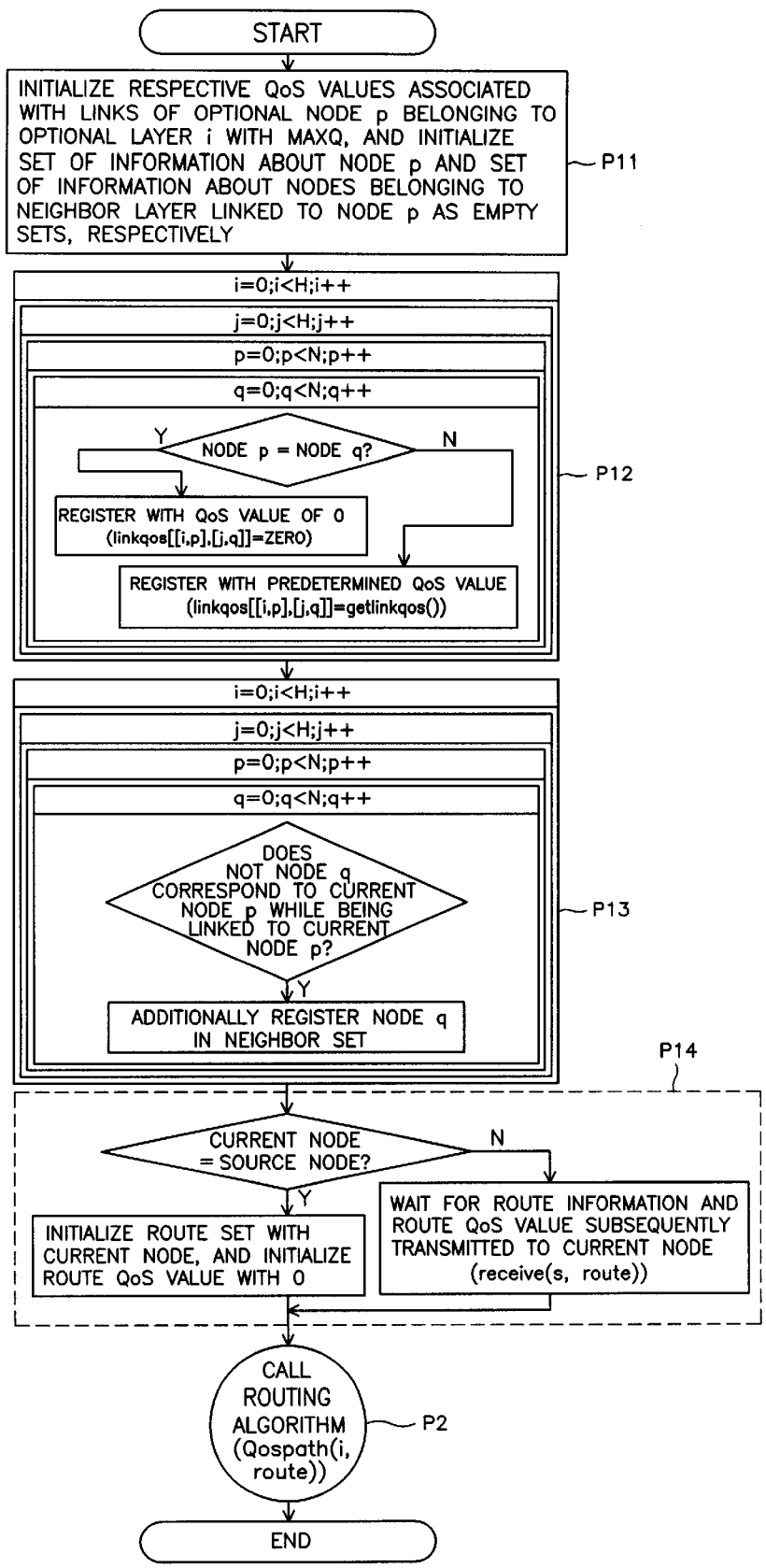
FIG. 7 is a flow chart illustrating a Hierarchical Distributed Generic Shortest Path Algorithm (HDGSPA) applied to a two level hierarchical network in accordance with a fourth embodiment of the present invention.

FIG. 7 is a flow chart illustrating a routing algorithm for determining an optimum path in a two level hierarchical network in accordance with another embodiment of the present invention. This routing algorithm is a Hierarchical Distributed Generic Shortest Path Algorithm (HDGSPA). This algorithm is substantially similar to the above mentioned DGSPA, except that the hierarchical layers of both levels should be initialized.

In accordance with the HDGSPA, an initialization procedure (Step P11) is first executed. In the initialization procedure, respective QoS values associated with links of an optional node p belonging to an optional layer i are initialized with a "MAXQ" value indicative of the fact that no path reaching the node p is found. Also, a set of information about the node p belonging to the layer i and a set of information about nodes belonging to a neighbor layer linked to the node p are set as empty sets, respectively.

For reference, the algorithm and parameters used are defined as follows:

struct{Qos tqos; Oset set;}node[H,N]; /*hierarchical address*/
Qos linkqos[[H,N],[H,N]]
Oset neighbor_set[H,N];
  struct Route{Qos tqos; Oset set;}route;
  struct Node{int s; int p;};
  node[i,p].tqos=MAXQ;
  node[i,p].set={@};
  neighbor_set[i,p]={@}

Subsequently, links associated with each node p belonging to each layer i are determined along with respective QoS values of those links in order to construct a neighbor set for the node p (Step S13). This determination is executed for all nodes existing in the network using a repetitive paragraph.

For the QoS value determination, it is first determined whether or not the node p and a node q neighboring to the node p while belonging to the layer i or belonging to a layer j neighboring to the layer i are the same. When the nodes p and q are different from each other, a predetermined QoS value is used. On the other hand, when the nodes p and q are the same, a QoS value of 0 is used (Step P12).

This may be executed using the following algorithm:

```
for(i=0; i<H; i++)for(j=0; j<H; j++){
for(p=0; p<N; p++)for(q=0; q<N; q++){
    if ((i,p)==(j,q))
        linkqos[[i,p],[j,q]]=ZERO;
    else
        linkqos[[i,p],[j,q]]=getlinkqos( );
}
}
```

Using the links and link QoS values determined for each node p as mentioned above, a neighbor set for the node p is then constructed. The construction of the neighbor set is executed for all nodes using a repetitive paragraph.

That is, when a node q neighboring to the current node p of the current layer i while belonging to the layer i or belonging to a layer j neighboring to the layer i does not correspond to the current node p while being a node passed, it is additionally registered in the neighbor set (Step P13).

This may be executed using the following algorithm:

```
for(i=0; i<H; i++)for(j=0; j<H; j++){
for(p=0; p<N; p++)for(q=0; q<N; q++){
if(linkqos[[i,p],[j,q]]!=ZERO && linkqos[[i,p], [j,q]]!=MAXQ)
    neighbor_set[i,p]=neighbor_set[i,p] ∪ (j,q);
}
}
/*connected: QoS value, disconnected: MAXQ*/
```

After completion of all the above mentioned initialization processes, a routing algorithm is begun. It is determined whether or not the current node of the current layer corresponds to the source node. Where the current node of the current layer corresponds to the source node, the route set is initialized with the current node. In this case, the total route QoS value is also initialized with a value of 0. In this state, the routing algorithm is called for an execution thereof [QoSpath(s, route)].

Where the current node does not correspond to the source node, the procedure waits for a route information and a total route QoS value subsequently transmitted to the current node during a routing executed in association with a node other than the current node [receive(s, route)]. In response to reception of those values, the routing algorithm is called [QoSpath(s, route)] (Steps P14 and P2).

This procedure may be executed using the following algorithm:

```
if (s is the source node){
route.set={s};
route.tqos=ZERO;
}
else {
receive (s, Qospath(s, route));
call (Qospath(s, route));
}
```

Figure 8:
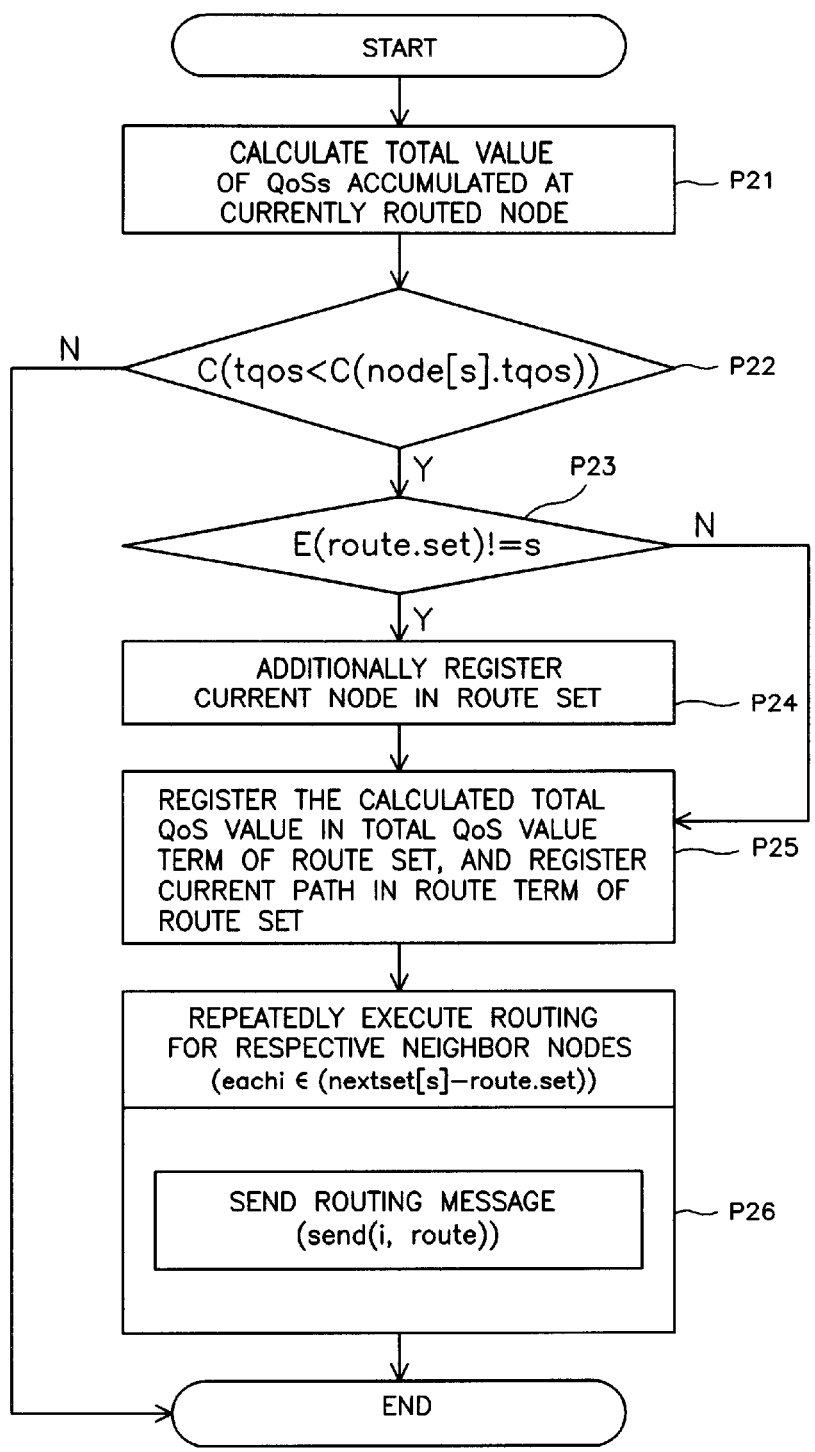
FIG. 8 is a flow chart illustrating the routing procedure of FIG. 7 in detail.

FIG. 8 is a flow chart illustrating the routing procedure P2 for determining an optimum path in accordance with the routing algorithm "Qospath(int s, Route route)" operating in response to the above mentioned calling. In the routing procedure P2, the total value of QoSs accumulated at the node of the layer currently routed is first calculated (Step T21).

For reference, the algorithm and parameters used are defined as follows:

```
Qospath(int s, Route route){
Qos tqos;
int i;
tqos=F(route.tqos, linkqos[E(route.set), s]);
```

The currently calculated total QoS value is then compared with the previously calculated total value of QoSs accumulated at the currently routed node of the current layer along another path. Such a comparison is necessary because there are a plurality of paths reaching the current node. Where the previous total QoS value is more optimum than the current total QoS value, the current routing is stopped. The procedure then waits for another routing call (Step P22).

On the other hand, where the current total QoS value is more optimum than the previous total QoS value, a correction of route information should be made, based on the current path, because the current path is more optimum than the previous path. In this case, accordingly, it is determined whether or not the last node of the current path corresponds to the current node (Step P23).

Where the last node of the current path does not correspond to the current node, it is additionally registered in the neighbor set (Step P24). The procedure then proceeds to step P25.

On the other hand, where the last node of the current path corresponds to the current node, step T24 is omitted. In this case, the total value of route QoSs accumulated at the current node along the current path is directly calculated. The reason why step T24 is omitted is because an addition of link information in this case results in a duplication of the current node.

At step P25, the total QoS value calculated at step P21 is registered in the total QoS value term of the route set, and the current path is registered in the route term of the route set. That is, the route set is updated using the current path and the total QoS value of the current path.

This may be executed using the following algorithm:

```
if (C(tqos)<C(node[s].tqos)){/*C: cost function for given Qos*/
    if (E(route.set)!=s)route.set=route.set ∪ s;
    route.tqos=tqos;
    node[s].set=route.set;
```

After completion of the above procedure, that is, completion of the routing for determining an optimum path for the called node, a routing message is sent to nodes neighboring to the current node. This message is transmitted to the call receiving step P14 involved in the initialization procedure. In response to a calling executed in accordance with the transmission of the message, steps P21 to P25 are repeatedly executed.

In particular, where the routing algorithm is repeatedly executed in response to the calling, the routing is begun after subtracting the route set of the previously routed node from the neighbor set of the same node in order to avoid a repeated routing for the path already routed (Step P26).

For example, the following expression may be established:

$$\{(s,p),(w,r),(f,g),(h,k)\} - \{(c,p),(w,r),(f,v),(h,r)\} = \{(s,p),(h,k)\}$$

This expression represents that where a routing starting from the layer h is executed, the layer s is left as a path to be routed because it has not been passed yet. In this case, the layers w and f are not to be routed because they have been passed. Also, the node k in the layer h is left as a node to be routed because it has not been passed yet.

Figure 9:
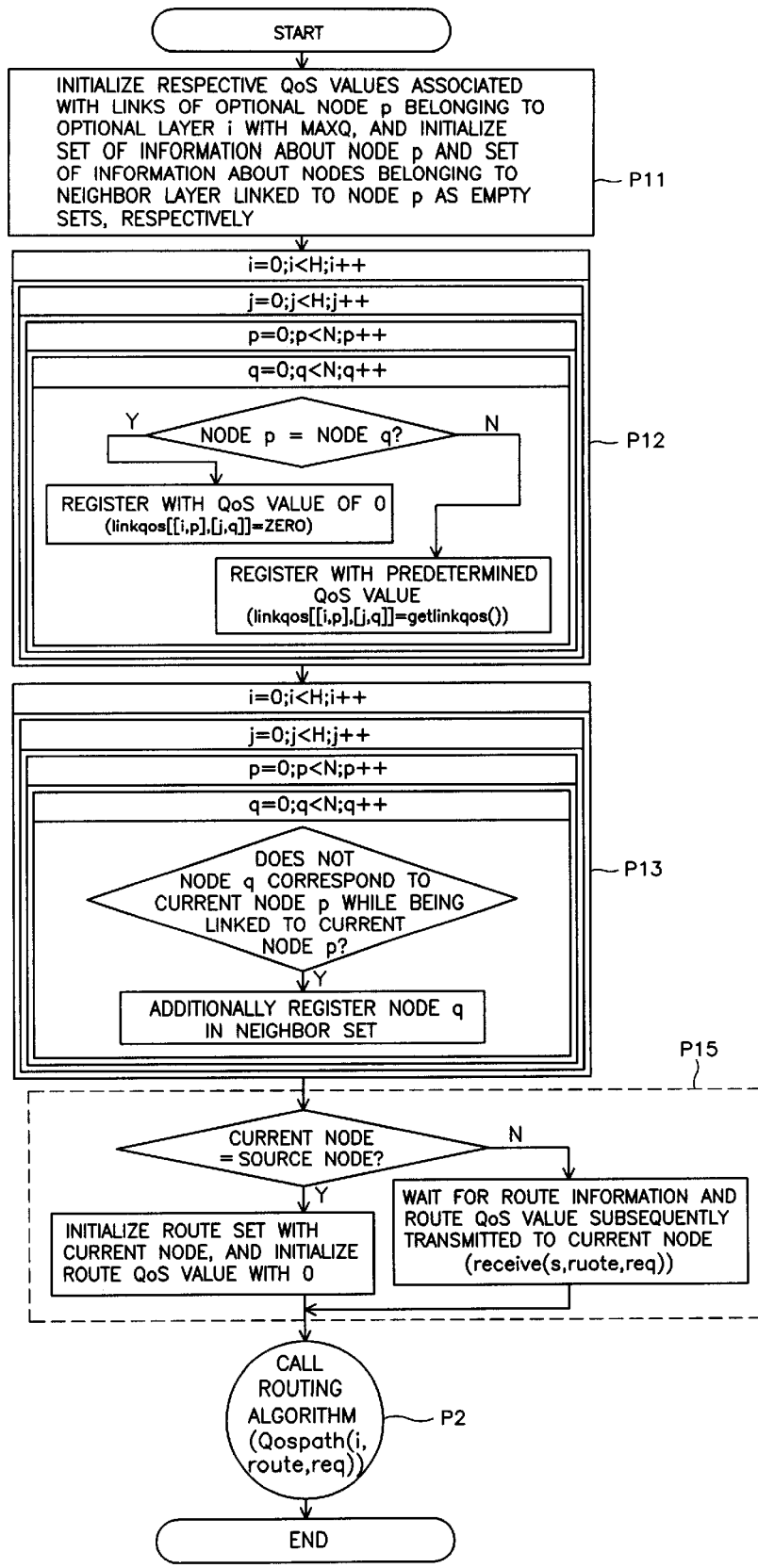
FIG. 9 is a flow chart illustrating a QoS Restricted Hierarchical Generic Shortest Path Algorithm (QRHDGSPA) applied to a two level hierarchical network in accordance with a fifth embodiment of the present invention.

The above procedure may be executed using the following algorithm:

for (each i∈(neighbor_set[s] route.set))
send (i, route);

FIG. 9 is a flow chart illustrating a routing algorithm for determining an optimum path in a two level hierarchical network in accordance with another embodiment of the present invention. This routing algorithm is a QoS Restricted Hierarchical Generic Shortest Path Algorithm (QRHDGSPA). This algorithm is substantially similar to the above mentioned QRDGSPA, except that the hierarchical layers of both levels should be initialized. The QRHDGSPA is different from the QRDGSPA in that all nodes satisfying a required reference QoS value are selected for optimum paths.

The algorithm of FIG. 9 is substantially similar to that of FIG. 7, except that a calling factor is additionally used at steps of calling a routing algorithm and receiving the result. This calling factor corresponds to the above mentioned reference QoS value.

That is, "receive(s, route)" in the algorithm of FIG. 7 is changed into "receive(s, route, req)" in the algorithm of FIG. 9 (Step P15). Also, "QoSpath(s, route)" in the algorithm of FIG. 7 is changed into "QoSpath(s, route, req)" in the algorithm of FIG. 9 (Step P2).

No description will be made in association with the remaining algorithm of FIG. 9 because it is the same as that of FIG. 7.

Figure 10:
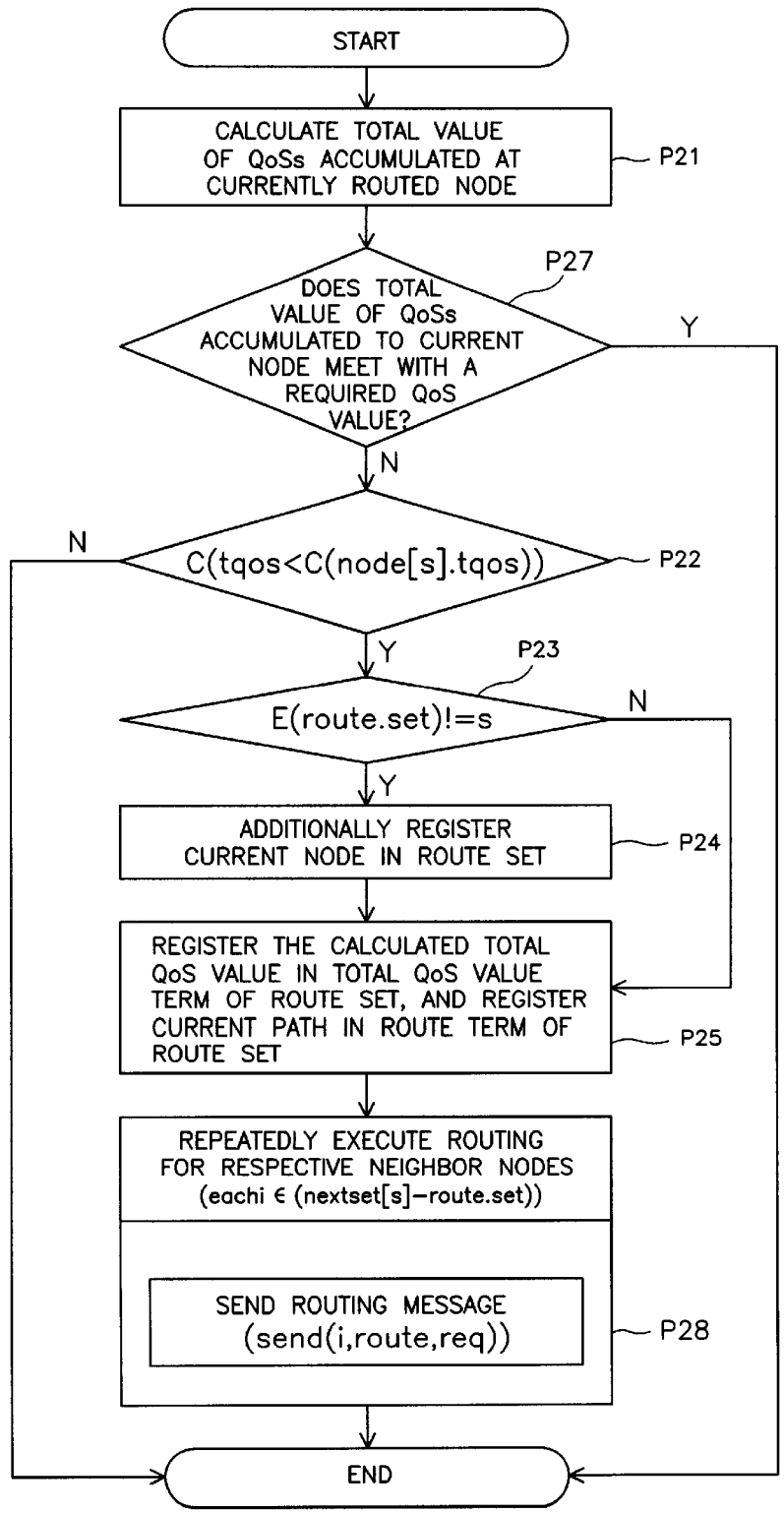
FIG. 10 is a flow chart illustrating the routing procedure of FIG. 9 in detail.

FIG. 10 is a flow chart illustrating a routing algorithm called in the QRHDGSPA. This algorithm is substantially similar to that of FIG. 8, except that a routing is executed for layers and that regions once routed are not to be routed again during a repeated routing.

The routing procedure illustrated in FIG. 10 is substantially similar to that of FIG. 8, except that it additionally involves the following procedure after the calculation of the total QoS value executed at step P21, as compared to the routing algorithm of FIG. 8.

That is, the routing algorithm of FIG. 10 additionally involves a procedure for determining whether or not the total value of QoSs accumulated from the source node to the current node of the current layer meets with a required QoS value set as the reference value. If the total QoS value meets with the reference QoS value, the routing algorithm is further executed. If not, the routing algorithm is ended [S(tqos, req)==FALSE] (Step P27).

At the final step of the routing algorithm, transmission of a routing message "(send(i, route, req))" is executed in order for a repeated execution of the routing algorithm (Step P28), as in the case of FIG. 8.

Since the remaining algorithm of FIG. 10 is the same as that of FIG. 8, no description thereof will be made.

In addition, where values to be compared with each other using the cost function "C( )" include delay values for reception of a message transmitted and respective numbers of hops existing between the source node and the destination node, it is preferred that the values generated in the current path be more optimum than those generated in the previous path. On the other hand, the values to be compared with each other include bandwidth values, it is preferred that the value generated in the current path be more than that generated in the previous path.

Such conditions may be optionally selected by the user in accordance with the routing method used.

Although the HDGSPA and QRHDGSPA according to the present invention have been described as being applied to a network having a two-level hierarchical architecture, for the convenience of description, they may be applied to a to network having a multi-level hierarchical architecture. In the latter case, the number of sets used are simply increased in accordance with the increased number of levels.

Figure 11:
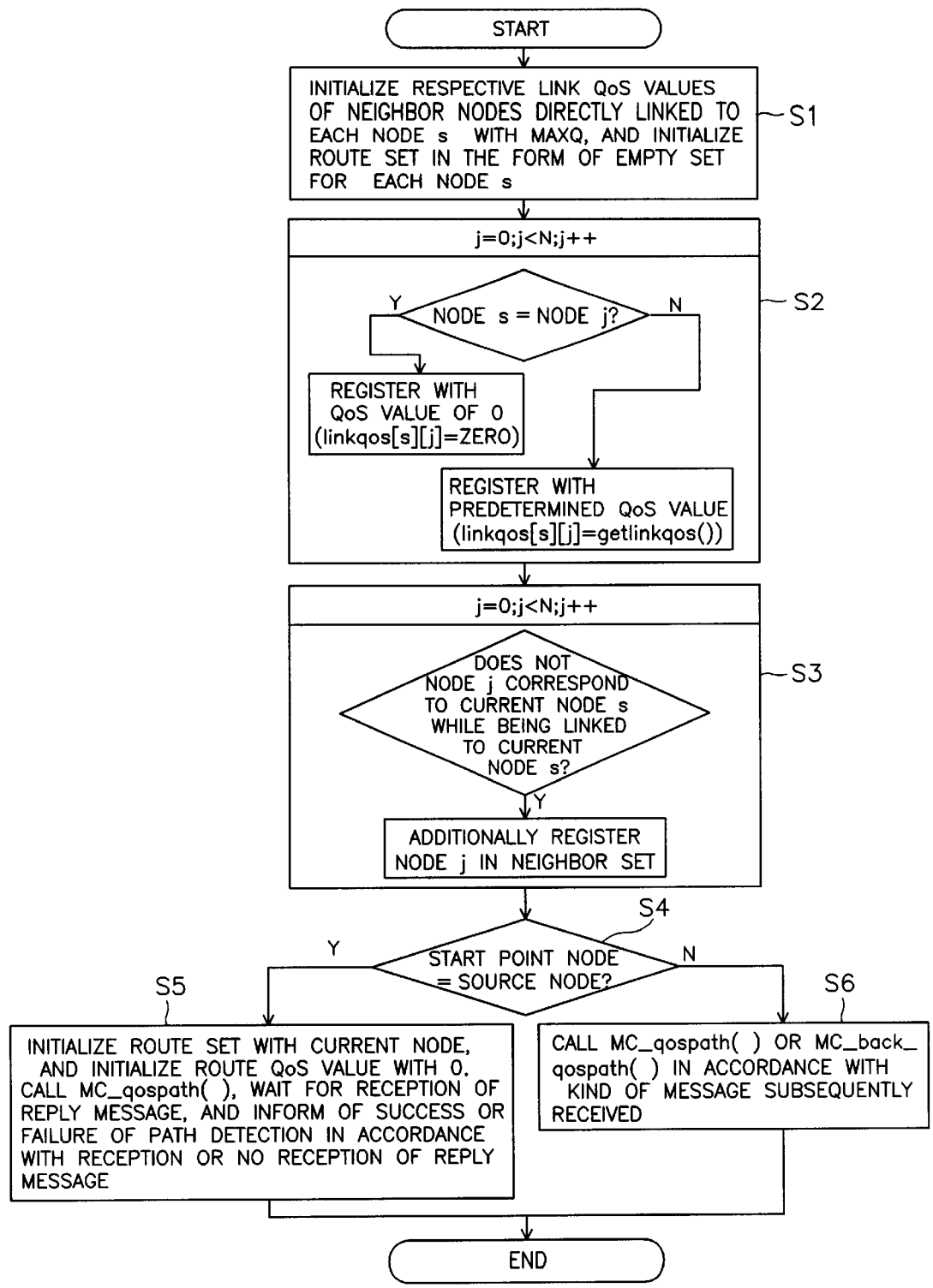
FIG. 11 is a flow chart illustrating a Multi-Casting Distributed Generic Shortest Path Algorithm (MCDGSPA) in accordance with a sixth embodiment of the present invention.

FIG. 11 is a flow chart illustrating a Multi-Casting Distributed Generic Shortest Path Algorithm (MCDGSPA) for providing QoS in accordance with another embodiment of the present invention.

This algorithm is used in the case in which a plurality of destinations are set by one source sending a message. In accordance with this algorithm, where the paths reaching respective destinations overlap together between the source and a certain intermediate node, messages are forwarded to the intermediate node via the same path, and then transmitted to respective destinations.

First, an initialization procedure S1 is executed in accordance with the algorithm of FIG. 11. In the initialization procedure S1, respective link QoS values for each node s existing in the network is initialized with a predetermined maximum value "MAXQ". The maximum QoS value MAXQ is indicative of the fact that no path reaching the node s is found. Also, information about the optional node s and information about neighbor nodes linked to the node s are initialized in the form of empty sets, respectively (S1).

For reference, the algorithm and parameters used are defined as follows:

typedef struct{Qos tqos; Oset set;}Route;
struct[Qos tos; Oset set;]node[s];
Oset neighbor_set[s];
Qos linkqos[s][N];
Route route;
node[s].tqos MAXQ;
node[s].set={@};
neighbor_set[s]={@};

Subsequently, links associated with each node s are determined along with respective QoS values of those links in order to construct a neighbor set for the node s (Step S2). This determination is executed for all nodes existing in the network using a repetitive paragraph. For the QoS value determination, it is first determined whether or not the node s and a node j neighboring to the node s are the same. When the nodes s and j are different from each other, a predetermined QoS value is used. On the other hand, when the nodes s and j are the same, a QoS value of 0 is used.

For this determination, the following algorithm may be used:

for (j=0; j<N; j++){
if (s==j)
  linkqos[s][j]=ZERO
else
  linkqos [s][j]=getlinkqos( );
}

Using the links and link QoS values determined for each node s as mentioned above, a neighbor set for the node s is then constructed. The construction of the neighbor set is executed for all nodes using a repetitive paragraph.

That is, when a node j neighboring to the current node s is not the same as the current node s while being linked to the current node, it is additionally registered in the neighbor set (Step S3).

This may be executed using the following algorithm:

```
for (j=0; j<N; j++){
if (linkqos[s][j]!=ZERO && linkqos[s][j]!=MAXQ)
    neighbor_set[s]=neighbor_set[s] ∪ j;
}
/*connected: QOS value, disconnected: MAXQ,
neighbor_set[s]: neighbor set of s*/
```

After completion of all the above mentioned initialization processes, a routing algorithm is begun. In order to begin the routing algorithm, it is determined whether or not a start point node corresponds to the source node (Step S4). Where the start point node corresponds to the source node, the route set is initialized with the current node (Step S5). In this case, the route QoS value is also initialized with a value of 0. In this state, a multi-casting routing algorithm "MC_qospath( )" is called. Subsequently, a routing message is transmitted. In this state, the source node waits for reception of a signal indicative of the fact that a path is detected for a period of time corresponding to two times a required delay time.

When the source node receives a path detection message REPLY, it determines a path having a highest weight, and informs of the fact that this path has been detected.

For reference, the weight W is defined by the condition in which the paths reaching respective destinations overlap together between the source node and a certain intermediate node.

In other words, a path having a weight is a path extending between the source node and a node forwardly diverged into nodes reaching respective destination nodes along different paths.

On the other hand, where the start point node does not correspond to the source node, that is, where the start point corresponds to a hop, a desired routing algorithm is called in accordance with the kind of a message subsequently received (Step S6). The routing algorithm may be a routing algorithm (MC-qospath( )) or a routing algorithm (MC_back_qospath( )). The routing algorithm "MC-qospath( )" is called by an intermediate node between the source node and the destination node when the intermediate node transmits a request message to the destination node along a path selected by the source node. In accordance with the routing algorithm "MC-qospath( )", the routing process is executed in a sequential fashion. On the other hand, the routing algorithm "MC_back_qospath( )" is called by an intermediate node between the source node and the destibation node when the intermediate node transmits a reply message to the source node along a path selected by the destination node. In accordance with the routing algorithm "MC back qospath( )", the path up to the current node is transmitted to the source node without any further execution of the routing process.

This procedure may be executed using the following algorithm:

```
route.set={ss};
route.tqos=ZERO;
if(ss is the source node){
    MC_qospath(ss, route, req));
    while(delay<2*requested_QoS_delay){
        wait_message_from_socket( );
        if (received the REPLY message from all destination
            nodes){
            select the weightiest route from source to destination
                nodes;
            exit(success);
        }
    }
    exit(fail);
}
else}
while(1){
    wait_message_from_socket);
    if(message_type=REQ)
        MC_qospath( );
    else if(message_type==REP)
        MC_back_qospath( );
}
}
```

Figure 12:
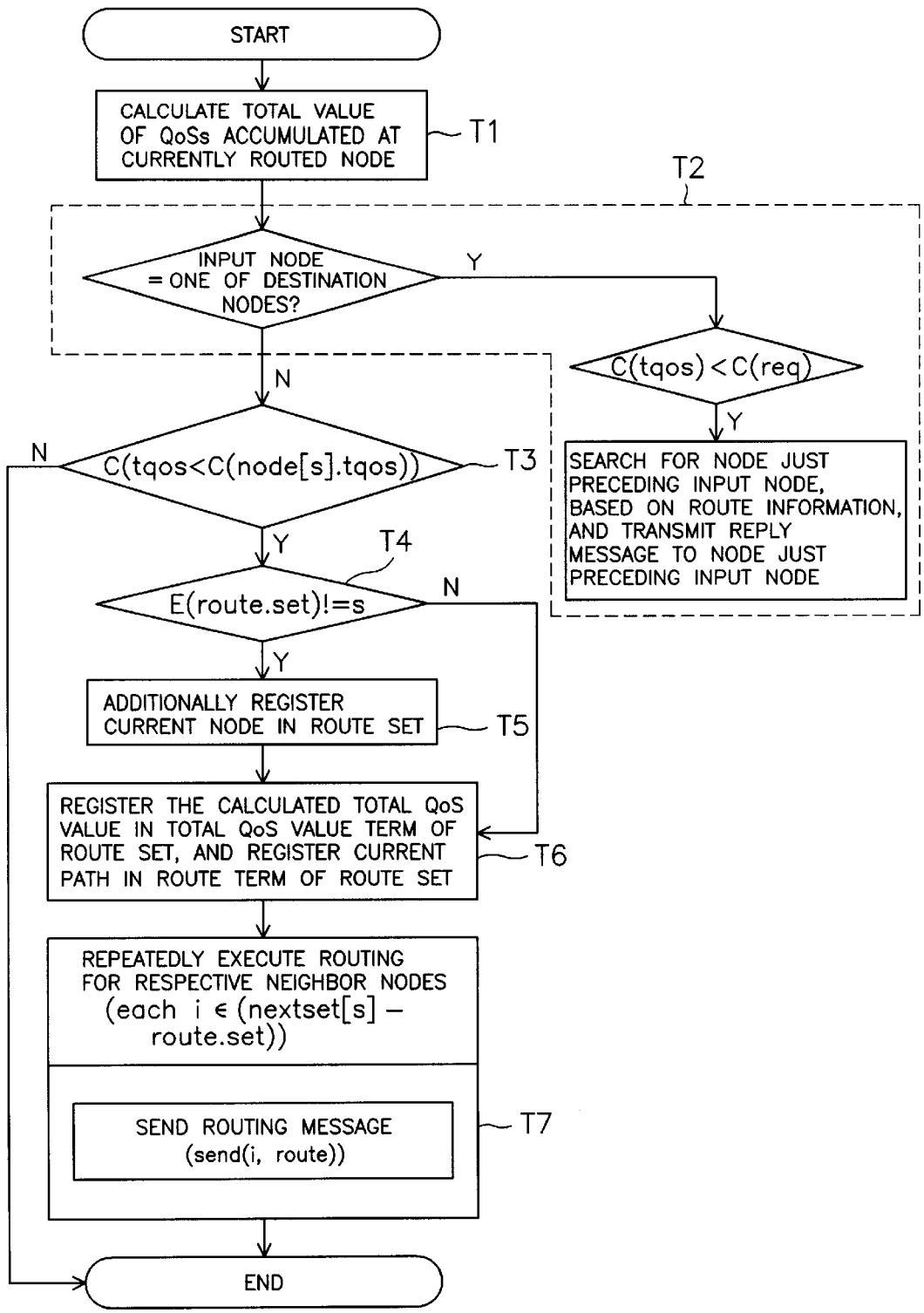
FIG. 12 is a flow chart illustrating a routing procedure executed where a routing start point corresponds to a source node in the procedure of FIG. 11.

FIG. 12 is a flow chart illustrating the routing procedure "(MC_qospath( ))" executed where the start point corresponds to the source node in the procedure of FIG. 11. In accordance with this routing procedure, the total value of QoSs accumulated at the node currently routed is calculated (Step T1).

For reference, the algorithm and parameters used are defined as follows:

```
Qospath(int s, Route route){
Qos tqos;
int i;
tqos=F(route.tqos, linkqos[E(route.set), s]);
```

It is then determined whether or not an input node to be routed corresponds to one of the destination nodes. Where the input node corresponds to one of the destination nodes, it is then determined whether or not the calculated total QoS value meets a predetermined reference QoS value. That is, it is determined whether or not the calculated total QoS value is more optimum than the predetermined reference QoS value. When the calculated total QoS value is more optimum than the reference QoS value, the source node is informed of paths detected. In order to determine a weightiest one of intermediate paths detected, a REPLY message is transmitted to a node just preceding the input node. At this time, the weight W is set to a value of 1 to (Step T2).

On the other hand, when it is determined that the input node does not correspond to any destination node, the currently calculated total QoS value is compared with the previously calculated total value of QoSs accumulated at the currently routed node along another path. Such a comparison is necessary because there are a plurality of paths reaching the current node. Where the previous total QoS value is more optimum than the current total QoS value, the current routing is stopped. The procedure then waits for another routing call (Step T3).

When it is determined at step T3 that the current total QoS value is more optimum than the previous total QoS value, a correction of routing information should be made, based on the current path, because the current path is less optimum than the previous path. In this case, accordingly, it is determined whether or not the last node of the current path corresponds to the current node (Step T4).

Where the last node of the current path does not correspond to the current node, this node is additionally registered in the node set (Step T5). The procedure then proceeds to step T6.

On the other hand, where the last node of the current path corresponds to the current node, step T5 is omitted. In this case, the total value of route QoSs accumulated at the current node along the current path is directly calculated. The reason why step T5 is omitted is because an addition of link information in this case results in a duplication of the current node.

At step T6, the total QoS value calculated at step T1 is registered in the total QoS value term of the route set, and the current path is registered in the route term of the route set. That is, the route set is updated using the current path and the total QoS value of the current path.

This may be executed using the following algorithm:

```
if(s is in a Destination set){
  if(C(tqos)<C(req)){
    R_node=E(route.set);
    route.set=route.set-R_node;
    send(REP, R_node route.set, W=1);
  };
};
  else if(C(tqos)<C(node[s].tqos)){/*C: cost function for given Qos*/
    if(E(route.set)!=s) route.set=route.set Us;
    route.tqos=tqos;
    node[s].set=route.set;
  }
```

After completion of the above procedure, that is, completion of the routing for determining an optimum path for the called node, a routing message "(i, Qospath(i, route)" is sent to nodes neighboring to the current node. This message is transmitted to the call receiving step S5 of FIG. 11. In response to a calling executed in accordance with the transmission of the message, steps T1 to T6 are repeatedly executed.

In particular, where the routing algorithm is repeatedly executed in response to the calling, the routing for each node linked to the path previously routed is begun after subtracting the route set of the previously routed node from the neighbor set of the same node in order to avoid a repeated routing for the path already routed (Step T7).

This may be executed using the following algorithm:

```
for (each i∈(neighbor_set[s] route.set)) send (i, route);
```

Figure 13:
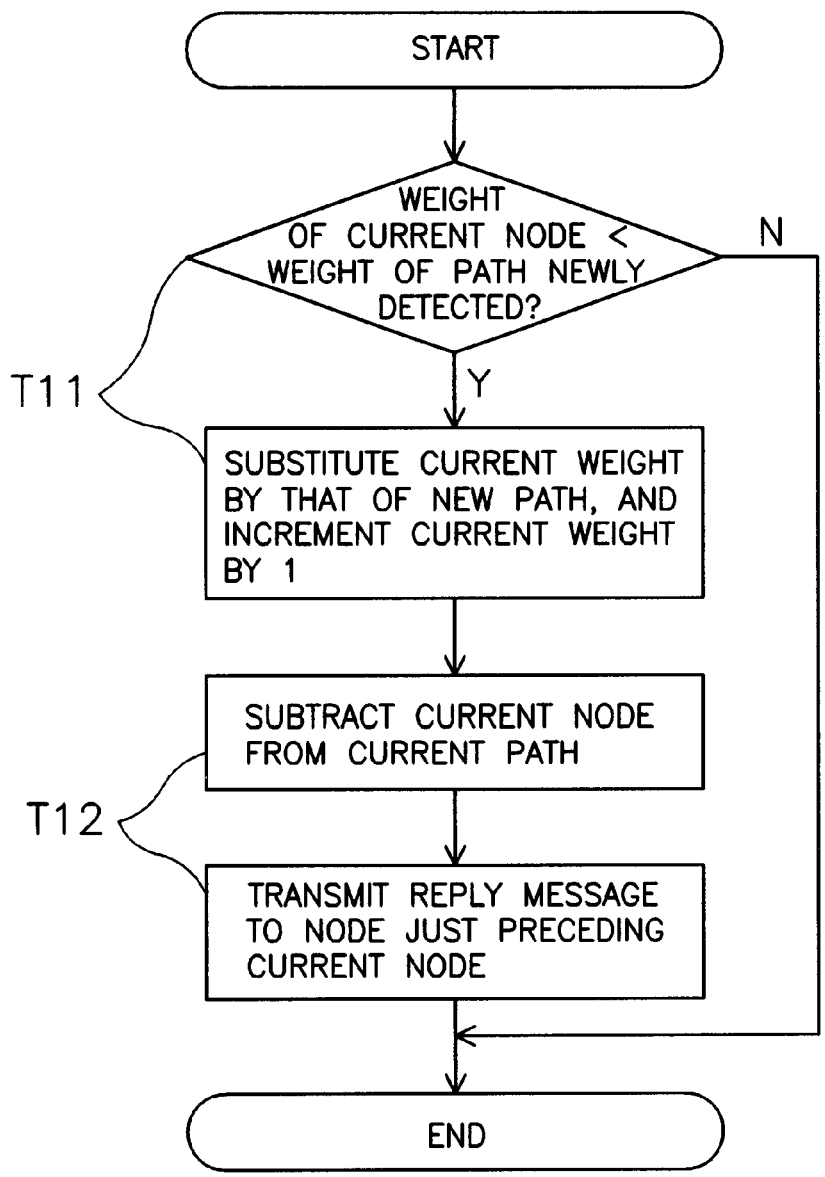
FIG. 13 is a flow chart illustrating a routing procedure executed where the routing start point does not corresponds to the source node in the procedure of FIG. 11.

FIG. 13 is a flow chart illustrating the routing procedure "(MC_back_qospath( ))" executed where the start point does not correspond to the source node in the procedure of FIG. 11. In accordance with this routing procedure, it is first determined whether or not there is a path having a weight higher than the weight stored in the current node. Where there is a path having a weight higher than the weight of the current node, the current weight is substituted by that of the path newly detected as having a higher weight, and then incremented by a value of 1 (Step T11).

Thereafter, the current node is subtracted from the path currently routed. A REPLY message is subsequently transmitted to a node just preceding the current node (Step T12).

This procedure may be executed using the following algorithm:

```
if(node.W<W){/* path with weight higher than weight stored in current node detected*/
  node.W=W;
  W++;
```

```
  R_node=E(route.set);
  route.set=route.set-R_node;
  send(REP, R_node, route, W);
}
```

Figure 14:
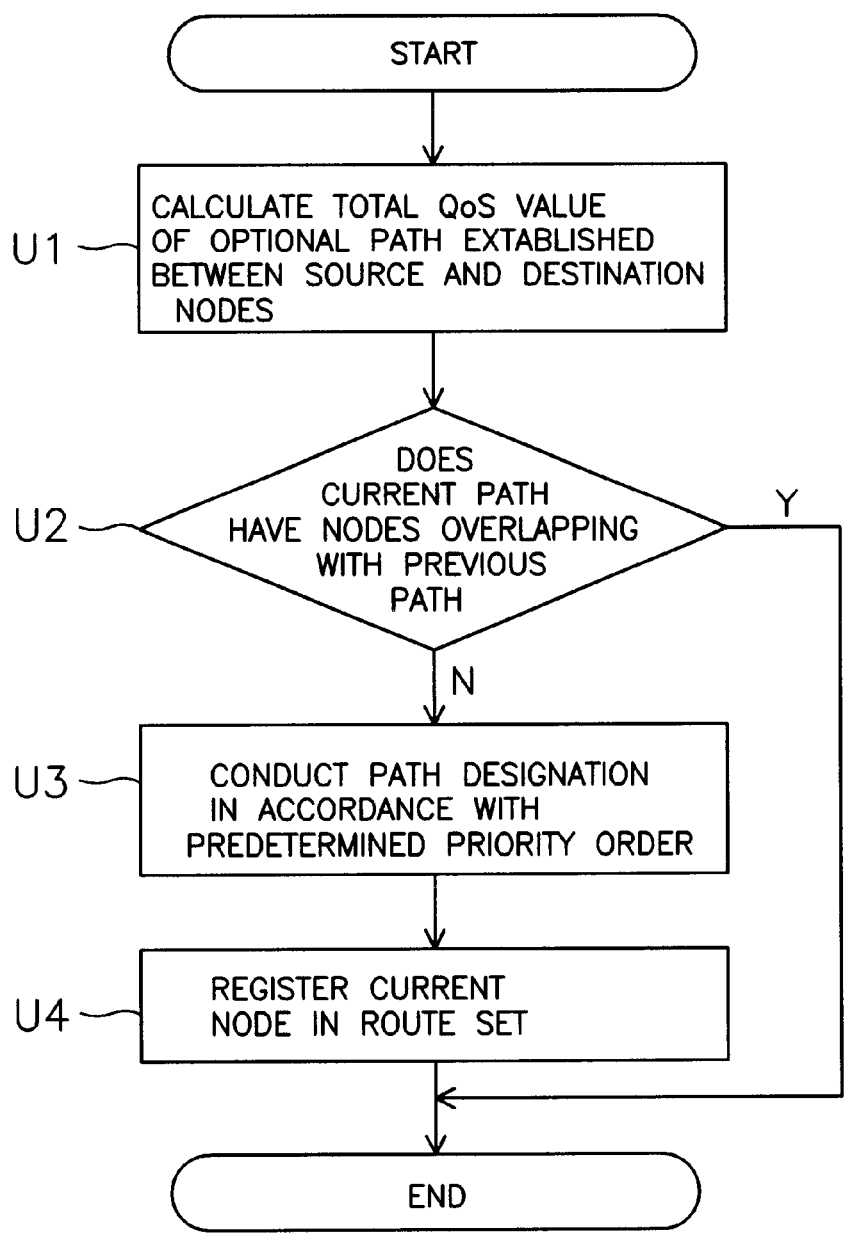
FIG. 14 is a flow chart illustrating a disjointed multi-path routing algorithm (DMDGSPA) for providing QoS in accordance with a seventh embodiment of the present invention.

FIG. 14 is a flow chart illustrating a disjointed multi-path routing algorithm (DMDGSPA) for providing QoS in accordance with another embodiment of the present invention. This algorithm is used to avoid a duplication of intermediate nodes in multiple optimum paths selected in accordance with the QRDGSPA in which all paths established between a single source node and a single destination node while meeting a required QoS are selected as optimum paths.

Where this algorithm is applied, there is no duplicated intermediate node in multiple optimum paths. Accordingly, there is an advantage in that it is possible to avoid an occasion in which multiple paths having a duplicated intermediate node cannot be used due to errors generated at the intermediate node.

Now, the disjointed multi-path routing algorithm will be described.

This algorithm basically includes the steps of calculating the total QoS value of an optional path established between a source node and a destination node (U1), determining whether or not the current path has nodes overlapping with the previous path (U2), conducting a path designation in accordance with a predetermined priority order between the current and previous paths when there is no node overlapping between the current and previous paths (U3), and registering the current node in the route set (U4).

In accordance with this algorithm, respective link QoS values for each node s existing in the network is initialized with a predetermined maximum value "MAXQ". The maximum QoS value MAXQ is indicative of the fact that no path reaching the node s is found. Also, information about the optional node s and information about neighbor nodes linked to the node s are initialized in the form of empty sets, respectively (S1).

For reference, the algorithm and parameters used are defined as follows:

```
typedef struct{Qos tqos; Oset set;}Route;
struct[Qos tos; Oset set;]node[s];
Oset neighbor_set[s];
Qos linkqos[s][N];
Route route;
node[s].tqos=MAXQ;
node[s].set={@};
neighbor_set[s]={@};
```

Subsequently, links associated with each node s are determined along with respective QoS values of those links in order to construct a neighbor set for the node s (Step S2). This determination is executed for all nodes existing in the network using a repetitive paragraph. For the QoS value determination, it is first determined whether or not the node s and a node j neighboring to the node s are the same. When the nodes s and j are different from each other, a predetermined QoS value is used. On the other hand, when the nodes s and j are the same, a QoS value of 0 is used.

For this determination, the following algorithm may be used:

```
for (j=0; j<N; j++){
    if (s==j)
        linkqos[s][j]=ZERO
    else
        linkqos [s][j]=getlinkqos( );
```

Using the links and link QoS values determined for each node s as mentioned above, a neighbor set for the node s is then constructed. The construction of the neighbor set is executed for all nodes using a repetitive paragraph.

That is, when a node j neighboring to the current node s is not the same as the current node s while being linked to the current node, it is additionally registered in the neighbor set.

This may be executed using the following algorithm:

```
for (j=0; j<N; j++){
    if (linkqos[s][j]!=ZERO && linkqos[s][j]!=MAXQ)
        neighbor_set[s]=neighbor_set[s] ∪ j;
}
/*connected: QOS value, disconnected: MAXQ,
neighbor_set[s]: neighbor set of s*/
```

After completion of all the above mentioned initialization processes, a routing algorithm is begun. In order to begin the routing algorithm, it is determined whether or not the current node corresponds to the source node (Step S4). Where the current node corresponds to the source node, the route set is initialized with the current node (Step S5). In this case, the route QoS value is also initialized with a value of 0. In this state, a routing algorithm is called [QoSpath(s, route, req)].

On the other hand, where the current node does not correspond to the source node, the procedure waits for route information and a route QoS value subsequently transmitted to the current node during a routing executed in association with a node other than the current node [receive(s, route, req)]. In response to reception of those values, the routing algorithm is called [QoSpath(s, route, req)].

This procedure may be executed using the following algorithm:

```
if (s is the source node){
    route.set={s};
    route.tqos=ZERO;
}
else{
    receive (s, Qospath(s, route, req));
    call (Qospath(s, route, req));
}
```

Figure 15:
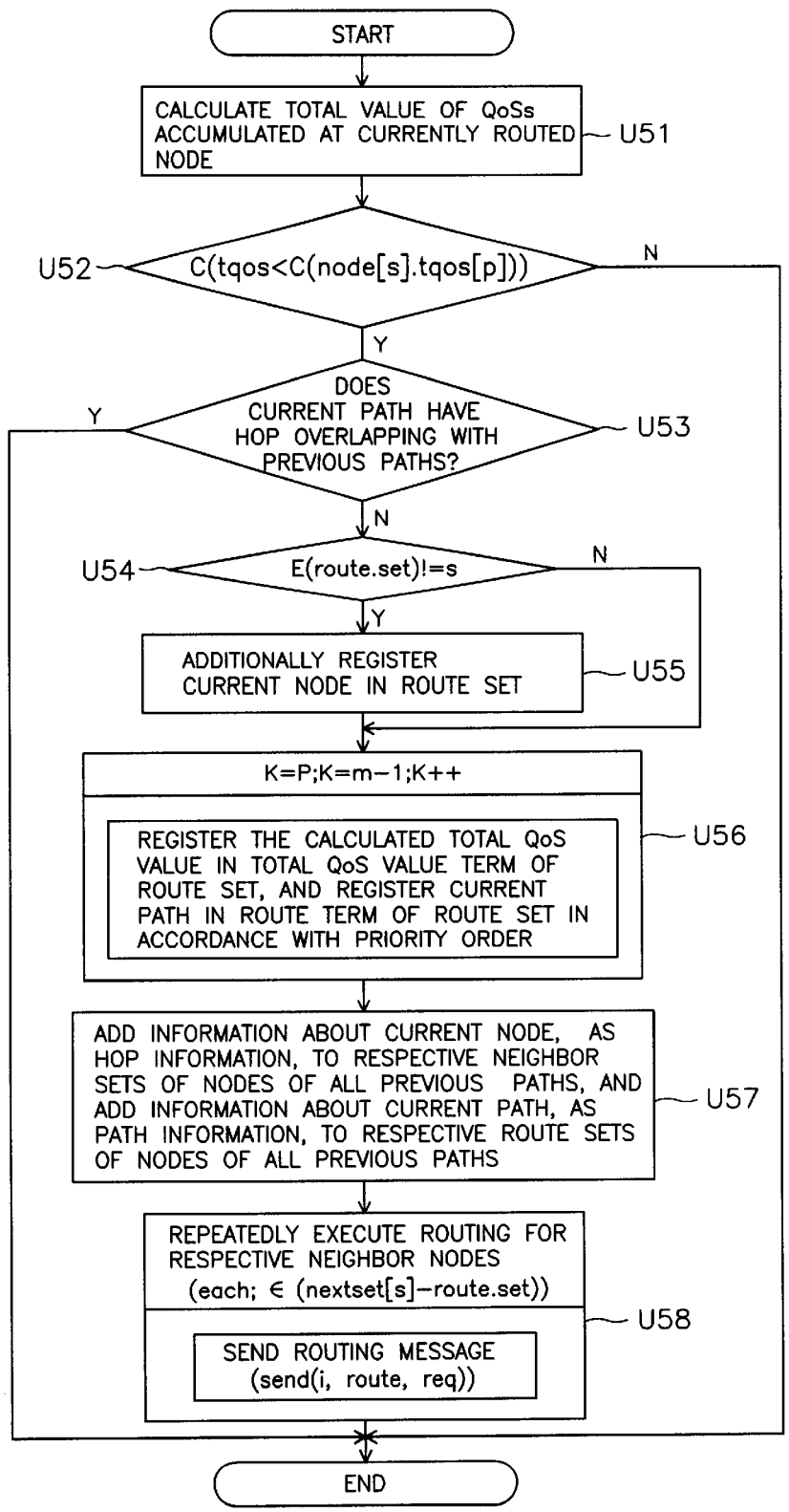
FIG. 15 is a flow chart illustrating the routing procedure of FIG. 14 in detail.

FIG. 15 is a flow chart illustrating the routing procedure of FIG. 14 in detail. In accordance with this routing procedure, the total value of QoSs accumulated at the node currently routed is first calculated (Step U51).

For reference, the algorithm and parameters used are defined as follows:

tqos=F(route.tqos, linkqos[E(route.set), s]);

The currently calculated total QoS value is then compared with the previously calculated total value of QoSs accumulated at the currently routed node along another path. Such a comparison is necessary because there are a plurality of paths reaching the current node. Where the previous total QoS value is more optimum than the current total QoS value, the current routing is stopped. The procedure then waits for another routing call (Step U52).

On the other hand, where the current total QoS value is more optimum than the previous total QoS value, a correction of routing information should be made, based on the current path, because the current path is less optimum than the previous path. In this case, it is determined whether or not the current path has a hop overlapping with the previous paths because all the routed paths should not have any duplicated hop.

Where the current path has a duplicated hop, the current path associated with the current node should not be added as a new path. In this case, accordingly, the routing algorithm executed no longer (Step U53).

On the other hand, where there is no duplicated hop in the current path, it is then determined whether or not the last node of the current path corresponds to the current node (Step U54). Where the last node of the current path does not correspond to the current, this node is additionally registered in the node set (Step U55).

On the other hand, where the last node of the current path corresponds to the current node, step U55 is omitted. In this case, the total value of route QoSs accumulated at the current node along the current path is directly calculated. The reason why step U55 is omitted is because an addition of link information in this case results in a duplication of the current node.

At step U56, the total QoS value calculated at step U51 is registered in the total QoS value term of the route set, and the current path is registered in the route term of the route set. That is, the current path and the total QoS value of the current path are inputted at an appropriate position in the route set in accordance with a predetermined priority order. The order of registered paths is then adjusted.

Thereafter, the information about the current node is added, as hop information, to respective neighbor sets of the nodes of all previous paths (Step U57). Also, the information about the current path is added, as path information, to respective route sets of the nodes of all previous paths.

After completion of the above procedure, that is, completion of the routing for determining an optimum path for the called node, a routing message "(send(i, route, req))" is sent to nodes neighboring to the current node without belonging to any one of the previous paths. This message is transmitted to the call receiving step involved in the initialization procedure. In response to a calling executed in accordance with the transmission of the message, steps U51 to U57 are repeatedly executed.

In particular, where the routing algorithm is repeatedly executed in response to the calling, the routing is begun after subtracting the route set of the previously routed node from the neighbor set of the same node in order to avoid a repeated routing for the path already routed (Step U58).

This may be executed using the following algorithm:

```
if(C(tqos)<C(node[s].tqos[p])){
    find the position p, meeting the QoS order, among diverse
        paths;
    /* 0=<p<m, p: the order of current path among m paths
        routed*/
    if(route.set−node[s].sset)==(route.set−ss)){
        if(E(route.set)!=s) route.set=route.set ∪ s;
        route.tqos=tqos;
        for(k=p;k<m−1; k++){
            node[s].tqos[k+1]=node[s].tqos[k]
            node[s].set[k+1]=node[s].set[k]
        }
```

```
    node[s].sset=node[s].set ∪ route.set;
    node[s].tqos[p]=tqos;
    node[s].set[p]=route.set;
    for(each i∈(neighbor_set[s]−route.set))
      send(i, route, req);
  }
 }
}
```

The above description relates to a routing procedure for an one level hierarchical network. Now, a routing procedure for a two level hierarchical network will be described.

For a routing procedure applied to a two level hierarchical network, the address of the two level hierarchical network is first defined by two integers [n, m].

Here, "n" represents a higher address whereas "m" represents a lower address.

A set of nodes assigned with the same higher address is defined as a "region". In particular, in this two level hierarchical network, link address lists cannot have address groups having the same higher address while being separated from each other by an address or an address group having a higher address different therefrom.

In other words, a node link, which leaves a region after passing through that region, cannot enter again that region.

For example, a routing address list of [1,2][1,4][1,3][3,1] [3,2][3,3][2,1][2,2] is suitable for an address list for a hierarchical routing. However, a routing address list of [1,2][1,4][1,3][3,1][2,1][3,2][3,3][2,2] is not unsuitable for an address list for a hierarchical routing because the address groups having the same higher address of "3" are separated from each other by an address having a higher address of "2" different from that of the address groups.

In the latter case, a node link is made which leaves a region corresponding to the higher address of "3" (that is, the region 3) after passing through the region 3, and then enters the region 3 at a node [3,2] after passing through a node [2,1]. That is, the node link conflicts with the condition in which it cannot enter a region after leaving that region.

Figure 16:
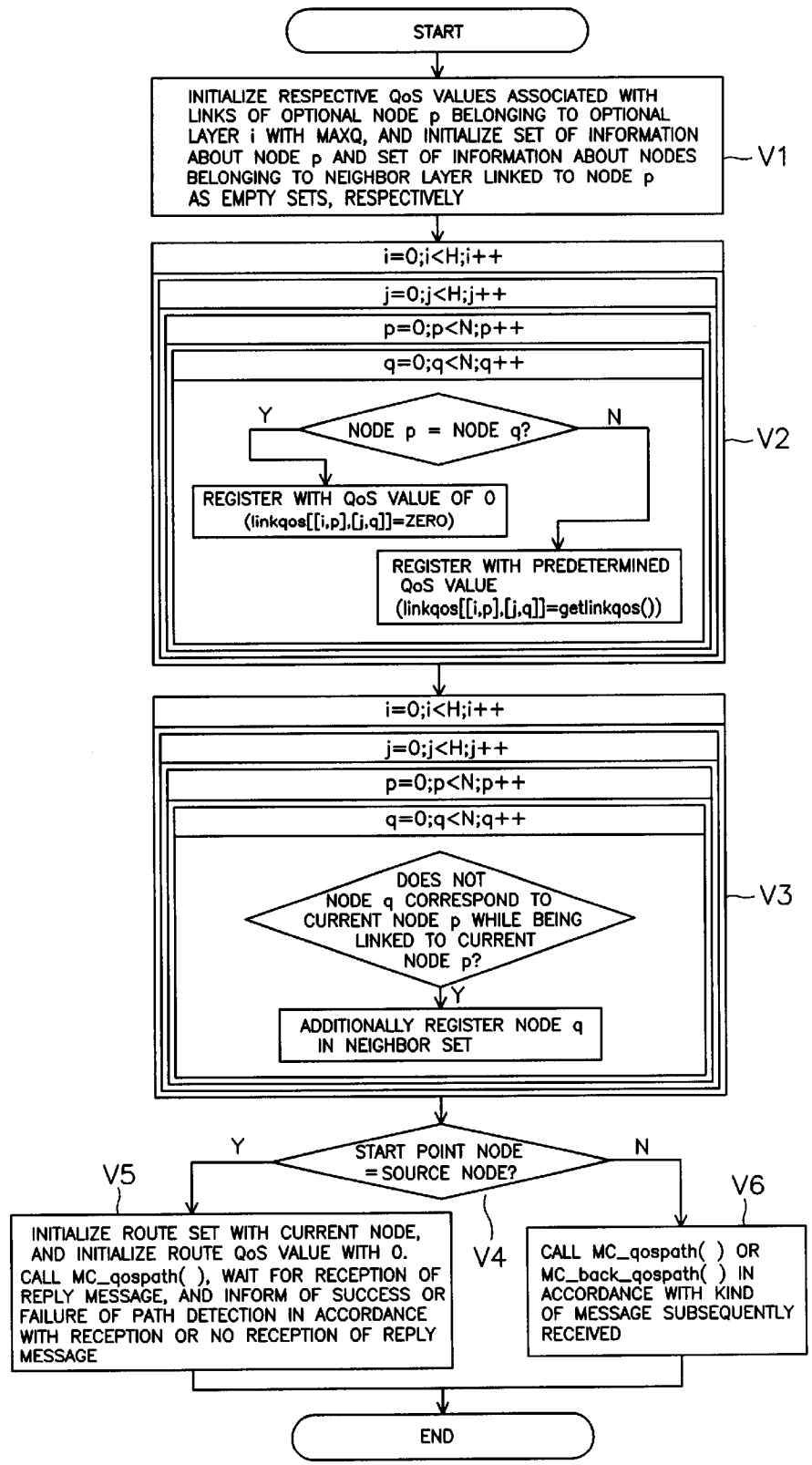
FIG. 16 is a flow chart illustrating a Multi-Casting Hierarchical Distributed Generic Shortest Path Algorithm (MCHDGSPA) applied to a two level hierarchical network in accordance with an eighth embodiment of the present invention.

FIG. 16 is a flow chart illustrating a routing algorithm for determining an optimum path in a two level hierarchical network in accordance with another embodiment of the present invention. This routing algorithm is a Multi-Casting Hierarchical Distributed Generic Shortest Path Algorithm (MCHDGSPA). This algorithm is substantially similar to the above mentioned MCDGSPA, except that the hierarchical layers of both levels should be initialized.

In accordance with the MCHDGSPA, an initialization procedure is first executed (Step V1). In the initialization procedure, respective QoS values associated with links of an optional node p belonging to an optional layer i are initialized with a "MAXQ" value indicative of the fact that no path reaching the node p is found. Also, a set of information about the node p belonging to the layer i and a set of information about nodes belonging to a neighbor layer linked to the node p are set as empty sets, respectively.

For reference, the algorithm and parameters used are defined as follows:

```
  struct{Qos tqos; Oset set;} node[H,N]; /*hierarchical
address*/
  Qos linkqos[[H,N],[H,N]]
  Oset neighbor_set[H,N];
  struct Route{Qos tqos; Oset set;}route;
  struct Node{int s; int p;};
  node[i,p].tqos=MAXQ;
  node[i,p].set={@};
  neighbor_set[i,p]={@}
```

Subsequently, links associated with each node p belonging to each layer i are determined along with respective QoS values of those links in order to construct a neighbor set for the node p (Step V2). This determination is executed for all nodes existing in the network using a repetitive paragraph. For the QoS value determination, it is first determined whether or not the node p and a node q neighboring to the node p while belonging to the layer i or belonging to a layer j neighboring to the layer i are the same. When the nodes p and q are different from each other, a predetermined QoS value is used. On the other hand, when the nodes p and q are the same, a QoS value of 0 is used.

This may be executed using the following algorithm:

```
for(i=0; i<H; i++)for(j=0; j<H; j++){
  for(p=0; p<N; p++)for(q=0; q<N; q++){
    if((i,p)==(j,q))
      linkqos[[i,p],[j,q]]=ZERO;
    else
      linkqos[[i,p],[j,q]]=getlinkqos( );
  }
}
```

Using the links and link QoS values determined for each node p as mentioned above, a neighbor set for the node p is then constructed. The construction of the neighbor set is executed for all nodes using a repetitive paragraph.

That is, when a node q neighboring to the current node p of the current layer i while belonging to the layer i or belonging to a layer j neighboring to the layer i does not correspond to the current node p while being a node passed, it is additionally registered in the neighbor set (Step V3).

This may be executed using the following algorithm:

```
for(i=0; i<H; i++)for(j=0; j<H; j++){
  for(p=0; p<N; p++)for(q=0; q<N; q++){
    if(linkqos[[i,p],[j,q]]!=ZERO && linkqos [[i,p], [j,q]]
    !=MAXQ)
      neighbor_set[i,p]=neighbor_set[i,p] ∪ (j,q);
  }
}
/*connected: QoS value, disconnected: MAXQ*/
```

After completion of all the above mentioned initialization processes, a routing algorithm is begun. In order to begin the routing algorithm, it is determined whether or not a start point node corresponds to the source node (Step V4).

Where the start point node corresponds to the source node, the route set is initialized with the start point node (Step V5). In this case, the route QoS value is also initialized with a value of 0. In this state, a multi-casting routing algorithm "MC_qospath( )" is called. Subsequently, a routing message is transmitted. In this state, the source node waits for reception of a signal indicative of the fact that a path is detected, for a period of time corresponding to two times a required delay time. When the source node receives a path detection message REPLY, it determines a path having a highest weight, and informs of the fact that this path has been detected. When the source node does not receive any path detection message REPLY, it informs of a failure of path detection.

For reference, the weight W is defined by the condition in which the paths reaching respective destinations overlap together between the source node and a certain intermediate node.

In other words, a path having a weight is a path extending between the source node and a node forwardly diverged into nodes reaching respective destination nodes along different paths.

On the other hand, where the start point node does not correspond to the source node, that is, where the start point corresponds to a hop, a desired routing algorithm is called in accordance with the kind of a message subsequently received (Step V6). The routing algorithm may be a routing algorithm (MC-qospath( )) or a routing algorithm (MC_back_qospath( )). The routing algorithm "MC-qospath( )" is called by an intermediate node between the source node and the destination node when the intermediate node transmits a request message to the destination node along a path selected by the source node. In accordance with the routing algorithm "MC-qospath( )", the routing process is executed in a sequential fashion. On the other hand, the routing algorithm "MC_back_qospath( )" is called by an intermediate node between the source node and the destibation node when the intermediate node transmits a reply message to the source node along a path selected by the destination node. In accordance with the routing algorithm "MC back qospath( )", the path up to the current node is transmitted to the source node without any further execution of the routing process.

This procedure may be executed using the following algorithm:

```
route.set={ss};
route.tqos=ZERO;
if(ss is the source node){
MC_qospath(ss, route, req));
while(delay<2*requested_QoS_delay){
    wait_message_from_socket( );
    if (received the REPLY message from all destination
        nodes){
    select the weightiest route from source to destination
        nodes;
    exit(success);
    }
}
exit(fail);
}
else{
while(1){
    wait_message_from_socket;
    if(message_type==REQ)
        MC_qospath( );
    else if(message_type==REP)
        MC_back_qospath( );
}
}
```

The routing procedures of FIG. 16 respectively conducted where the start point node corresponds to the source node and where the start point node does not correspond to the source node are the same as those illustrated in FIGS. 12 and 13. Accordingly, no further description will be made for those routing procedures. Of course, the routing procedures of FIG. 16 are different from those illustrated in FIGS. 12 and 13 in that the procedure for transmitting a routing message is different from the step T7 in the procedure of FIG. 12.

That is, where the routing algorithm is repeatedly executed in response to the calling, the routing is begun after subtracting the route set of the previously routed node from the neighbor set of the same node in order to avoid a repeated routing for the path already routed.

For example, the following expression may be established:

$$\{(s,p),(w,r),(f,g),(h,k)\}-\{(c,p),(w,r),(f,v),(h,r)\{=\{(s,p),(h,k)\}$$

This expression represents that where a routing starting from the layer h is executed, the layer s is left as a path to be routed because it has not been passed yet. In this case, the layers w and f are not to be routed because they have been passed. Also, the node k in the layer h is left as a node to be routed because it has not been passed yet.

Figure 17:
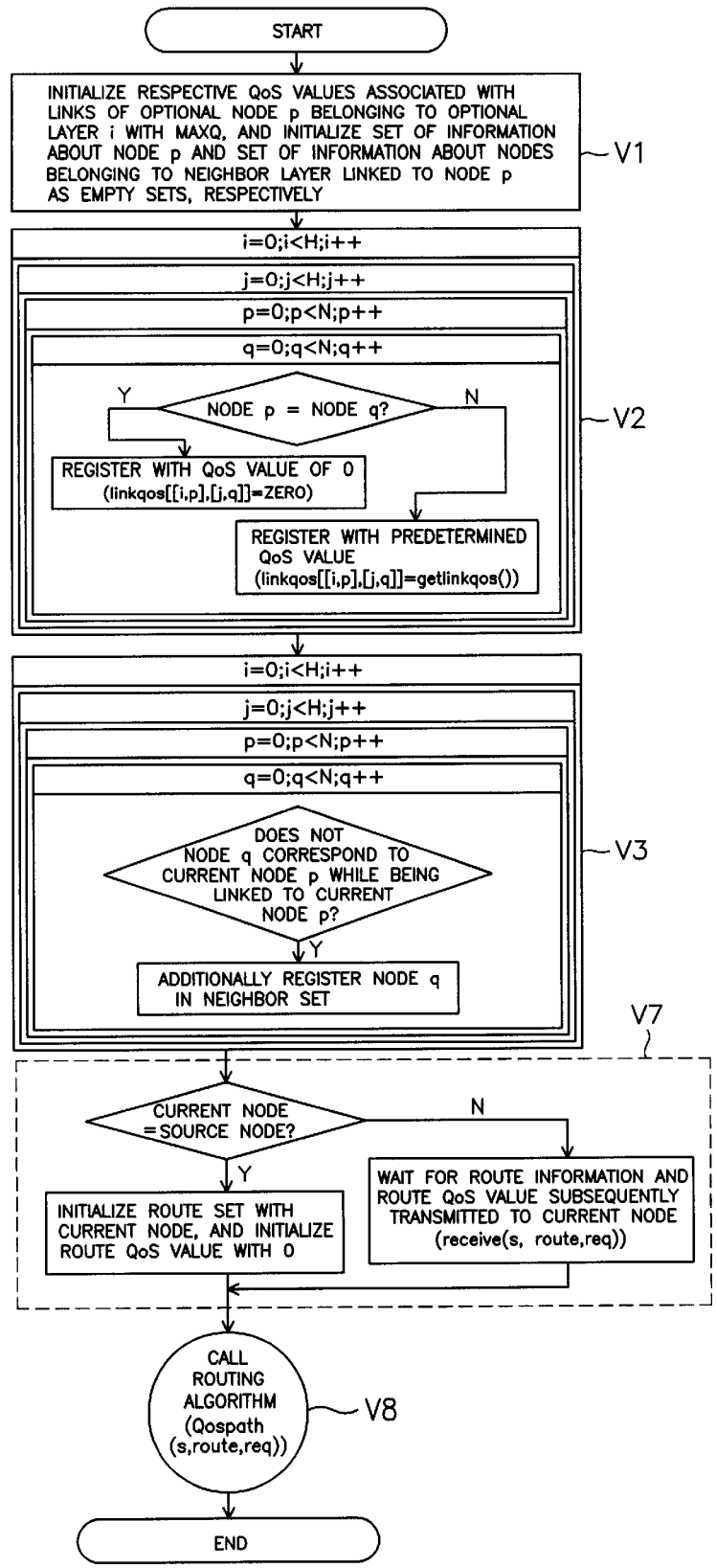
FIG. 17 is a flow chart illustrating a QoS-based disjointed multi-path routing algorithm (DMHDGSPA) applied to a two level hierarchical network in accordance with a ninth embodiment of the present invention.

FIG. 17 is a flow chart illustrating a QoS-based disjointed multi-path hierarchical routing algorithm (DMHDGSPA) for a two level hierarchical network in accordance with another embodiment of the present invention. This algorithm involves the same initialization procedure (Steps V1 to V3) as that in the algorithm of FIG. 16. Accordingly, the following description will be made only for different procedures.

After the initialization procedure is completely executed in accordance with completion of steps V1 to V3, a routing algorithm is begun. In order to begin the routing algorithm, it is determined whether or not the current node corresponds to the source node (Step V7). Where the current node corresponds to the source node, the route set is initialized with the current node. In this case, the route QoS value is also initialized with a value of 0. In this state, a routing algorithm is called [QoSpath(s, route, req)] (Step V8).

On the other hand, where the current node does not correspond to the source node, the procedure waits for route information and a route QoS value subsequently transmitted to the current node during a routing executed in association with a node other than the current node [receive(s, route, req)]. In response to reception of those values, the routing algorithm is called [QoSpath(s, route, req)].

This procedure may be executed using the following algorithm:

```
if (s is the source node){
route.set={s};
route.tqos=ZERO;
}
else{
receive (s, Qospath(s, route, req));
call (Qospath(s, route, req));
}
```

The routing procedure of FIG. 17 is the same as that illustrated in FIG. 15. Accordingly, no further description will be made for the routing procedure. Of course, the routing procedure of FIG. 17 is different from that of FIG. 15 in that the procedure for transmitting a routing message is different from the step U58 in the procedure of FIG. 15.

That is, where the routing algorithm is repeatedly executed in response to the calling, the routing is begun after subtracting the route set of the previously routed node from the neighbor set of the same node in order to avoid a repeated routing for the path already routed. Since the routing procedure is the same as the above described routing procedure of FIG. 16, no further description will be made.

Heretofore, various routing methods according to the present invention have been described. In addition, where values to be compared with each other using the cost function (C) include delay values for reception of a message transmitted and respective numbers of hops existing between the source node and the destination node, it is preferred that the values generated in the current path be more optimum than those generated in the previous path. On the other hand, the values to be compared with each other include bandwidth values, it is preferred that the value generated in the current path be more than that generated in the previous path.

Such conditions may be optionally selected by the user in accordance with the routing method used. Although the HDGSPA and QRHDGSPA according to the present invention have been described as being applied to a network having a two-level hierarchical architecture, for the convenience of description, they may be applied to a network having a multi-level hierarchical architecture. In the latter case, the number of sets used are simply increased in accordance with the increased number of levels.

As apparent from the above description, the present invention provides various routing methods based on a QoS required for the transmission of multimedia information in a variety of data communication networks. That is, the present invention provides routing algorithms for providing a shortest path routing applicable to a one level hierarchical network, which algorithms include a GSPA, in which a shortest one among all paths established in association with one destination is selected, a DGSPA in which the routing of GSPA is conducted in a distributed fashion to achieve a fast routing, and a QRDGSPA, in which any one of paths established in association with one destination may be selected as a shortest path when the QoS value calculated in association therewith is more optimum than a required reference QoS value, in order to prevent problems caused by an error generated at the single path in the GSPA. The present invention also provides routing algorithms for providing a shortest path routing applicable to a multi-level hierarchical network. These algorithms include HDGSPA and QRHDGSPA which are respective modified versions of DGSPA and QRDGSPA adapted to allow those DGSPA and QRDGSPA to be applicable to a multi-level hierarchical network.

The present invention further provides an MCDGSPA which is a routing algorithm for providing a shortest path routing applicable to a one level hierarchical network. The MCDGSPA is applied to the case in which there are a plurality of destinations for the same source. Also, there is a DMDGSPA which is a modified version of QRDGSPA adapted to avoid a duplication of intermediate nodes in multiple optimum paths selected in accordance with the QRDGSPA in which all paths established between a single source node and a single destination node while meeting a required QoS are selected as optimum paths. The present invention also provides MCHDGSPA and DMHDGSPA which are respective modified versions of MCDGSPA and DMDGSPA adapted to allow those to MCDGSPA and DMDGSPA to be applicable to a multi-level hierarchical network. Accordingly, the present invention provides an advantage in that the user can select an algorithm, most suitable for the environment of the system used, from the above routing algorithms.

What is claimed is:

1. A routing method in a data communication network for selecting a shortest path among a plurality of paths established between a single source node and a single destination node comprising the steps of:

(A) initializing a set of information about links of nodes in all paths existing in the network and Quality of Service (QoS) values for the links; and (B) designating a routing start point after completion of the initialization, and executing a routing process from the designated routing start point, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

2. The routing method in accordance with claim 1, wherein the step (A) comprises the steps of:

(A-a) initializing respective QoS values of the links;

(A-b) initializing, for an optional one of the nodes, a route set containing information about nodes linked between a source note and the optional node along a shortest path, and a total value of QoSs accumulated at the optional node along the shortest path;

(A-c) initializing, for optional node, a neighbor set containing information about neighbor nodes linked to the node;

(A-d) determining links associated with the optional node along with respective QOS values of the associated links;

(A-e) constructing the neighbor set for the optional node, based on the determined links and QoS values;

(A-f) repeatedly executing the steps (A-b) to (A-e); and (A-g) designating a selected one of the nodes as a routing start point, initializing the node information of the route set of the selected node with the routing start point, and initializing the total QoS value information of the route set of the selected node with a value of 0, to begin a routing procedure starting from the selected node.

3. A routing method in a data communication network for selecting a shortest path among a plurality of paths established between a single source node and a single destination node comprising the steps of:

(A) initializing a set of information about links of nodes in all paths existing in the network and Quality of Service (QoS) values for the links; and (B) designating a routing start point after completion of the initialization, and executing a routing process from the designated routing start point, wherein the step (A) for constructing the neighbor set for the optional node comprises the steps of:

(A-a) initializing respective QoS values of the links;

(A-b) initializing, for an optional one of the nodes, a route set containing information about nodes linked between a source node and the optional node along a shortest path, and a total value of QoSs accumulated at the optional node along the shortest path;

(A-c) initializing, for the optional node, a neighbor set containing information about neighbor nodes linked to the node;

(A-d) determining links associated with the optional node along with respective QoS values of the associated links;

(A-e) constructing the neighbor set for the optional node, based on the determined links and QoS values;

(A-f) repeatedly executing the steps (A-b) to (A-e); and (A-g) designating a selected one of the nodes as a routing start point, initializing the node information of the route set of the selected node with the routing start point, and initializing the total QoS value information of the route set of the selected node with a value of 0, to begin a routing procedure starting from the selected node, and wherein the step (B) comprises the steps of:

(B-a) calculating a total value of QoSs accumulated at a node currently routed along a current path;

(B-b) comparing the currently calculated total QoS value with a previously calculated total value of QoSs accumulated at the current node along another path, and stopping the current routing while waiting for another routing call when the previous total QoS value is less than the current total QoS value;

(B-c) if it is determined at step (B-b) that the current total QoS value is more optimum than the previous total QoS value, then determining whether or not the last node of the current path corresponds to the current node, to conduct a correction of routing information based on the current path;

(B-d) additionally registering the last node of the current path in the neighbor set of the current node when it is determined at the step (B-c) that the last node of the current path does not correspond to the current node, while omitting the additional registration when it is determined that the last node of the current path corresponds to the current node;

(B-e) registering the total QoS value calculated at the step (B-a) in the total QoS value term of the route set of the current node, and registering the current path in the route term of the route set of the current node; and (B-f) subtracting the resultant route set of the current node from the resultant neighbor set of the current node; and (B-g) repeatedly executing the steps (B-a) to (B-f) for each of neighbor nodes registered in the neighbor set of the current node, to conduct for a routing for the neighbor node.

4. A routing method in a data communication network for selecting a shortest path among a plurality of paths established between a single source node and a single destination node comprising the steps of:

(A) initializing a set of information about links of nodes in all paths existing in the network and Quality of Service (QoS) values for the links;

(B) designating a routing start point after completion of the initialization, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

5. A routing method in a data communication network for selecting a shortest path among a plurality of paths established between a single source node and a single destination node comprising the steps of:

(A) initializing a set of information about links of nodes in all paths existing in the network and Quality of Service (QoS) values for the links;

(B) designating a routing start point after completion of the initialization, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links;

(A-d) constructing the neighbor set for the optional node, based on the determined links and QoS values;

(A-e) repeatedly executing the steps (A-b) to (A-d);

(A-f) designating a selected one of the nodes as a routing start point, determining whether or not the selected node corresponds to a source node;

(A-g) if the selected node corresponds to the source node, then initializing the node information of the route set of the selected node with the source node, initializing the QoS value information of the route set of the selected node with a value of 0, and calling the routing means; and (A-h) if the selected node does not correspond to the source node, than waiting for route information and an associated total QoS value subsequently transmitted, as a routing message, to the selected node during a routing executed in association with a node other than the selected node, and calling the routing means in response to a reception of the routing message at the selected node.

6. The routing method in accordance with claim 5, wherein the step (A-d) for constructing the neighbor set for the optional node comprises the steps of:

determining whether or not a node neighboring to the optional node is not the same as the optional node while being linked to the optional node; and if it is determined that the node neighboring to the optional node is not the same as the optional node while being linked to the optional node, then additionally registering the neighbor node in the neighbor set of the optional node.

7. The routing method in accordance with claim 5, wherein the step (B) comprises the steps of:

(B-a) calculating a total value of QoSs accumulated at a node currently route along a current path;

(B-b) comparing the currently calculated total QoS value with a previously calculated total value of QoSs accumulated at the first current node along another path, and stopping the current routing while waiting for another routing call when the previous total QoS value is more optimum than the current total QoS value;

(B-c) if it is determined at step (B-b) that the current total QoS value is more optimum than the previous total QoS value then determining whether or not the last node of the current path corresponds to the current node, to conduct a correction of routing information based on the current path;

(B-d) additionally registering the last node of the current path in the neighbor set of the current node when it is determined at the step (B-c) that the last node of the current path does not correspond to the current node, while omitting the additional registration when it is determined that the last node of the current path corresponds to the current node;

(B-e) registering the total QoS value calculated at the step (B-a) in the total QoS value term of the route set of the current node, and registering the current path in the route term of the route set of the current node;

(B-f) subtracting the resultant route set of the current node from the resultant neighbor set of the current node, and transmitting a routing message, indicative of information about the resultant route set, to the node waiting for the routing message; and (B-g) repeatedly executing the steps (B-a) to (B-f) for each of neighbor nodes registered in the neighbor set of the current node, to conduct for a routing for the neighbor node.

8. A routing method in a data communication network for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) includes the step of constructing a neighbor set for an optional node based on links and QoS value which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

9. A routing method in a data communication network for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links;

(A-d) constructing the neighbor set for the optional node, based on the determined links and QoS values;

(A-e) repeatedly executing the steps (A-b) to (A-d);

(A-f) designating a selected one of the nodes as a routing start point, determining whether or not the selected node corresponds to a source node;

(A-g) if the selected node corresponds to the source node, initializing the node information of the route set of the selected node with the source node, then initializing the QoS value information of the route set of the selected node with a value of 0, and calling the routing means; and (A-h) if the selected node does not correspond to the source node, then waiting for route information and an associated total QoS value subsequently transmitted, as a routing message, to the selected node during a routing executed in association with a node other than the selected node, along with the reference QoS value, and calling the routing means in response to a reception of the routing message at the selected node.

10. The routing method in accordance with claim 9, wherein the step (A-d) for constructing the neighbor set for the optional node comprises the steps of:

determining whether or not a node neighboring to the optional node is not the same as the optional node while being linked to the optional node; and if it is determined that the node neighboring to the optional node is not the same as the optional node while being linked to the optional node, then additionally registering the neighbor node in the neighbor set of the optional node.

11. The routing method in accordance with claim 9, wherein the step (B) comprises the steps of:

(B-a) calculating a total value of QoSs accumulated at a node currently routed along a current path;

(B-b) determining whether or not the currently calculated total QoS value meets the reference QoS value, and stopping the current routing when the currently calculated total QoS value does not meet the reference QoS value;

(B-c) if the currently calculated total QoS value meets the reference QoS value, then comparing the currently calculated total QoS value with a previously calculated total of QoS accumulated at the current node along another path, and stopping the current routing while waiting for another routing call when the previous total QoS value is more optimum than the current total QoS value;

(B-d) if it is determined at step (B-c) that the current total QoS value is more optimum than the previous total QoS value, then determining whether or not the last node of the current path corresponds to the current node, to conduct a correction of routing information based on the current path;

(B-e) additionally registering the last node of the current path in the neighbor set of the current node when it is determined at the step (B-d) that the last node of the current path does not correspond to the current node, while omitting the additional registration when it is determined that the last node of the current path corresponds to the current node;

(B-f) registering the total QoS value calculated at the step (B-a) in the total QoS value term of the route set of the current node, and registering the current path in the route term of the route set of the current node;

(B-g) subtracting the resultant route set of the current node from the resultant neighbor set of the current node, and transmitting a routing message, indicative of infuriation about the resultant route set along with the reference QoS value, to the node waiting for the message; and (B-g) repeatedly executing the steps (B-a) to (B-f) for each of neighbor nodes registered in the neighbor set of the current node, to conduct for a routing for the neighbor node.

12. A routing method in a multi-level hierarchical data communication network having a plurality of layers for selecting a shortest path among a plurality of paths established between a single source node and a single destination node comprising the steps of:

(A) initializing a set of information about links of nodes in all paths existing in the network and Quality of Service (QoS) values for the links;

(B) designating a routing start point after completion of the initialization, calling a routing means to execute a distributed routing process from the designated routing start point, and waiting for a routing message from the routing means responding to the call; and (C) controlling the routing means to execute the routing process in response to the call in such a fashion that those of the layers once routed are not routed again, and to transmit the routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

13. A routing method in a multi-level hierarchical data communication network having a plurality of layers for selecting a shortest path among a plurality of paths established between a single source node and a single destination node comprising the steps of:

(A) initializing a set of information about links of nodes in all paths existing in the network and Quality of Service (QoS) values for the links;

(B) designating a routing start point after completion of the initialization, calling a routing means to execute a distributed routing process from the designated routing start point, and waiting for a routing message from the routing means responding to the call; and (C) controlling the routing means to execute the routing process in response to the call in such a fashion that those of the layers once routed are not routed again, and to transmit the routing message to the routing start point from which the call is made, wherein the step (A) comprises the steps of:

(A-a) initializing respective QoS values of the links;

(A-b) initializing, for an optional one of nodes existing in an optional one of the layers, a route set containing information about the optional node and a neighbor set containing information about neighbor nodes linked to the optional node;

(A-c) determining links associated with the optional node along with respective QoS values of the associated links;

(A-d) constructing the neighbor set for the optional node, based on the determined links and QoS values;

(A-e) repeatedly executing the steps (A-b) to (A-d);

(A-f) designating a selected one of the nodes as a routing start point, determining whether or not the selected node corresponds to a source node;

(A-g) if the selected node corresponds to the source node, then initializing the node information of the route set of the selected node with the source node, initializing the QoS value information of the route set of the selected node with a value of 0, and calling the routing means; and (A-h) if the selected node does not correspond to the source node, then waiting for route information and an associated total QoS value subsequently transmitted, as a routing message, to the selected node during a routing executed in association with a node other than the selected node, and calling the routing means in response to a reception of the routing message at the selected node.

14. The routing method in accordance with claim 13, wherein the step (A-d) for constructing the neighbor set for the optional node comprises the steps of:

determining whether or not a node neighboring to the optional node is not the same as the optional node while being linked to the optional node; and if it is determined that the node neighboring to the optional node is not the same as the optional node while being linked to the optional node, then additionally registering the neighbor node in the neighbor set of the optional node.

15. The routing method in accordance with claim 13, wherein the step (B) comprises the steps of:

(B-a) calculating a total value of QoSs accumulated at a node currently routed along a current path;

(B-b) comparing the currently calculated total QoS value with a previously calculated total value of QoSs accumulated at the current node along another path, and stopping the current routing while waiting for another routing call when the previous total QoS value is more optimum than the current total QoS value;

(B-c) if it is determined at step (B-b) that the current total QoS value is more optimum than the previous total QoS value, then determining whether or not the last node of the current path corresponds to the current node, to conduct a correction of routing information based on the current path;

(B-d) additionally registering the last node of the current path in the neighbor set of the current node when it is determined at the step (B-c) that the last node of the current path does not correspond to the current node, while omitting the additional registration when it is determined that the last node of the current path corresponds to the current node;

(B-e) registering the total QoS value calculated at the step (B-a) in the total QoS value term of the route set of the current node, and registering the current path in the route term of the route set of the current node;

(B-f) subtracting the resultant route set of the current node from the resultant neighbor set of the current node, and transmitting a routing message, indicative of information about the resultant route set, to the node waiting for the routing message; and (B-g) repeatedly executing the steps (B-a) to (B-f) for each of neighbor nodes registered in the neighbor set of the current node, to conduct for a routing for the neighbor node.

16. A routing method in a multi-level hierarchical data communication network having a plurality of layers for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

17. A routing method in a multi-level hierarchical data communication network having a plurality of layers for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call, and to transmit the routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links;

(A-d) constructing the neighbor set for the optional node, based on the determined links and QoS values;

(A-e) repeatedly executing the steps (A-b) to (A-d);

(A-f) designating a selected one of the nodes as a routing start point, determining whether or not the selected node corresponds to a source node;

(A-g) if the selected node corresponds to the source node, then initializing the node information of the route set of the selected node with the source node, initializing the QoS value information of the route set of the selected node with a value of 0, and calling the routing means; and (A-h) if the selected node does not correspond to the source node, then waiting for route information and an associated total QoS value subsequently transmitted, as a routing message, to the selected node during a routing executed in association with a node other than the selected node, along with the reference QoS value, and calling the routing means in response to a reception of the routing message at the selected node.

18. The routing method in accordance with claim 18, wherein the step (A-d) for constructing the neighbor set for the optional node comprises the steps of:

determining whether or not a node neighboring to the optional node is not the same as the optional node while being linked to the optional node; and if it is determined that the node neighboring to the optional node is not the same as the optional node while being linked to the optional node, then additionally registering the neighbor node in the neighbor set of the optional node.

19. The routing method in accordance with claim 18, wherein the step (B) comprises the steps of:

(B-a) calculating a total value of QoSs accumulated at a node currently routed along a current path;

(B-b) determining whether or not the currently calculated total QoS value meets the reference QoS value, and stopping the current routing when the currently calculated total QoS value does not meet the reference QoS value;

(B-c) if the currently calculated total QoS value meets the reference QoS value, then comparing the currently calculated total QoS value with a previously calculated total value of QoSs accumulated at the current node along another path, and stopping the current routing while waiting for another routing call when the previous total QoS value is more optimum than the current total QoS value;

(B-d) if it is determined at step (B-c) that the current total QoS value is more optimum than the previous total QoS value, then determining whether or not the last node of the current path corresponds to the current node, to conduct a correction of routing information based on the current path;

(B-e) additionally registering the last node of the current path in the neighbor set of the current node when it is determined at the step (B-d) that the last node of the current path does not correspond to the current node, while omitting the additional registration when it is determined that the last node of the current path corresponds to the current node (B-f) registering the total QoS value calculated at the step (B-a) in the total QoS value term of the route set of the current node, and registering the current path in the route term of the route set of the current node;

(B-g) subtracting the resultant route set of the current node from the resultant neighbor set of the current node, and transmitting a routing message, indicative of information about the resultant route set along with the reference QoS value, to the node waiting for the message; and (B-h) repeatedly executing the steps (B-a) to (B-g) for each of neighbor nodes registered in the neighbor set of the current node, to conduct for a routing for the neighbor node.

20. A routing method in a data communication network for selecting a shortest path among a plurality of paths established between a single source node and each of destination nodes for multicasting comprising the steps of:

(A) initializing a set of information about links of nodes in all paths existing in the network and Quality of Service (QoS) values for the links;

(B) designating a routing start point after completion of the initialization, calling a multi-casting routing means to execute a distributed routing process from the designated routing start point, and waiting for a routing message from the multi-casting routing means responding to the call; and (C) controlling the multi-casting routing means to execute the routing process in response to the call, and to transmit the routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

21. The routing method in accordance with claim 20, wherein the step (A) comprises the steps of:

(A-a) initializing respective QoS valves of the links; (A-b) initializing, for an optional one of the nodes, a route set containing information about the optional node and a neighbor set containing information about neighbor nodes linked to the optional node;

(A-c) determining links associated wvith the optional node along with respective QoS values of the associated links;

(A-d) constructing the neighbor set for the optional node, based on the determined links and QoS values; and (A-e) repeatedly executing the steps (A-b) to (A-d).

22. A routing method in a data communication network for selecting a shortest path among a plurality of paths established between a single source node and each of destination nodes for multicasting comprising the steps of:

(A) initializing a set of information about links of nodes in all paths existing in the network and Quality of Service (QoS) values for the links;

(B) designating a routing start point after completion of the initialization, calling a multi-casting routing means to execute a distributed routing process from the designated routing start point, and waiting for a routing message from the multi-casting routing means responding to the call; and (C) controlling the multi-casting routing means to execute the routing process in response to the call, and to transmit the routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links;

(A-d) constructing the neighbor set for the optional node, based on the determined links and QoS values; and (A-e) repeatedly executing the steps (A-b) to (A-d), and wherein the step (B) comprises the steps of:

(B-a) designating a selected one of the nodes as a routing start point, and determining whether or not the selected node corresponds to a source node;

(B-b) if the selected node corresponds to the source node, then initializing the node information of the route set of the selected node with the source node, initializing the QoS value information of the route set of the selected node with a value of 0, transmitting a multi-casting routing request message to nodes neighboring to the source node, and waiting for a path detection message generated in response to the multi-casting routing request message for a predetermined period of delay time; and (B-c) if the selected node does not correspond to the source node, then waiting for a routing message subsequently transmitted to the selected node during a routing executed in association with a node other than the selected node, and calling, in response to a reception of the routing message at the selected node, the multi-casting routing means or weight comparing and routing means selected by the routing message.

23. The routing method in accordance with claim 22, wherein the step (B-c) comprises the steps of:

(B-c-a) calculating a total value of QoSs accumulated at a node currently routed along a current path;

(B-c-b) determining whether or not the current node corresponds to one of the destination nodes, and if the current node corresponds to one of the destination nodes, then determining whether or not the currently calculated total QoS value meets a predetermined reference QoS value;

(B-c-c) comparing the currently calculated total QoS value with a previously calculated total value of QoSs accumulated at the current node along another path when the current node does not corresponds to any one of the destination nodes, and stopping the current routing while waiting for another routing call when the previous total QoS value is more optimum than the current total QoS value;

(B-c-d) if it is determined at step (B-b) that the current total QoS value is more optimum than the previous total QoS value, then determining whether or not the last node of the current path corresponds to the current node, to conduct a correction of routing information based on the current path;

(B-c-e) additionally registering the last node of the current path in the neighbor set of the current node when it is determined at the step (B-c-d) that the last node of the current path does not correspond to the current node, while omitting the additional registration when it is determined that the last node of the current path corresponds to the current node;

(B-c-f) registering the total QoS value calculated at the step (B-a) in the total QoS value term of the route set of the current node, and registering the current path in the route term of the route set of the current node;

(B-c-g) subtracting the resultant route set of the current node from the resultant neighbor set of the current node, and transmitting a routing message, indicative of information about the resultant route set, to the node waiting for the routing message; and (B-c-h) repeatedly executing the steps (B-c-a) to (B-c-g) for each of neighbor nodes registered in the neighbor set of the current node, to conduct for a routing for the neighbor node.

24. The routing method in accordance with claim 23, wherein the step (B-c-b) comprises the steps of informing the source node of a path detection when it is determined that the currently calculated total QoS value meets a predetermined reference QoS value; and transmitting a path detection message to a node just preceding to the current node to determine a weightiest one of intermediate paths established between the source node and the destination node by a value of 1.

25. The routing method in accordance with claim 22, wherein the step (B) comprises the steps of:

determining a weightiest one of paths established between the source node and the destination nodes in response to a reception of the path detection message, and informing the destination nodes of a detection of the weightiest path; and informing the destination nodes of a routing failure when there is not path detection message received within the predetermined period of delay time.

26. The routing method in accordance with claim 22, wherein the weight comparing and routing means carries out, in response to the calling associated therewith at the step (C), the steps of:

determining whether or not there is a path having a higher weight than that stored in the selected node; and if there is a weightier path, substituting the stored weight of the selected node by the weight of the weightier path, and incrementing the substituted weight by a value of 1; and subtracting the selected node from a route set indicative of information about the weightier path, and transmitting the resultant route set along with the resultant weight associated therewith, as a path detection message, to a node just preceding the selected node.

27. A routing method in a data communication network for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

28. The routing method in accordance with claim 27, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values.

29. A routing method in a data communication network for selecting paths satisfying a reference Quality of Service (QOS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while reflecting the remaining routed paths, and to transmit the resultant routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values, and wherein the step (B) comprises the steps of:

(B-a) designating a selected one of the nodes as a routing start point, and determining whether or not the selected node corresponds to a source node;

(B-b) if the selected node corresponds to the source node, then initializing the node information of the route set of the selected node with the source node, initializing the QoS value information of the route set of the selected node with a value of 0, and calling the routing means; and (B-c) if the selected node does not correspond to the source node, then waiting for route information and an associated total QoS value subsequently transmitted, as a routing message, to the selected node during a routing executed in association with a node other than the selected node, and calling the routing means in response to a reception of the routing message at the selected node.

30. A routing method in a data communication network for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made, wherein the step (A) comprises the steps of:

(A-a) initializing respective QoS values of the links;

(A-b) initializing, for an optional one of the nodes, a route set containing information about the optional node and a neighbor set containing information about neighbor nodes linked to the optional node;

(A-c) determining links associated with the optional node alone with respective QoS values of the associated links; and (A-d) constructing the neighbor set for the optional node, based on the determined links and QoS values, and wherein the step (C) comprises the steps of:

(C-a) calculating a total value of QoSs accumulated at a node currently routed along a current path;

(C-b) comparing the currently calculated total QOS value with a previously calculated total value of QoSs accumulated at the current node along another path, and stopping the current routing while waiting for another routing call when the previous total QoS value is more optimum than the current total QoS value;

(C-c) if it is determined at step (C-b) that the current total QoS value is more optimum than the previous total QoS value, then determining whether or not the current path has at least one node overlapping with other paths previously routed;

(C-d) if the current path has no overlapping node, then determining whether or not the last node of the current path corresponds to the current node;

(C-e) additionally registering the last node of the current path in the neighbor set of the current node when it is determined at the step (C-d) that the last node of the current path does not correspond to the current node, while omitting the additional registration when it is determined that the last node of the current path corresponds to the current node;

(C-f) registering the total QoS value calculated at the step (C-a) in the total QoS value term of the route set of the current node, and inputting the current path at an appropriate position in the route set of the current node in accordance with a predetermined priority order (C-g) adding information about the current node, as hop information, to respective neighbor sets of the nodes of all the previous paths while adding information about the current path, as route information, to respective route sets of the nodes of all the previous paths;

(C-h) transmitting a routing message, indicative of information about the resultant route set, to the node waiting for the routing message; and (C-i) repeatedly executing the steps (C-a) to (C-h) for each of neighbor nodes registered in the neighbor set of the current node, to conduct for a routing for the neighbor node.

31. The routing method in accordance with claim 30, further comprising the step of:

if the current path has at least one overlapping node, stopping the routing process associated with the current node.

32. A routing method in a multi-level hierarchical data communication network having a plurality of layers for selecting a shortest path among a plurality of paths established between a single source node and each of destination nodes comprising the steps of:

(A) initializing a set of information about links of nodes in all paths existing in the network and Quality of Service (QoS) values for the links;

(B) designating a routing start point after completion of the initialization, calling a multi-casting routing means to execute a distributed routing process from the designated routing start point, and waiting for a routing message from the multi-casting routing means responding to the call; and (C) controlling the multi-casting routing means to execute the routing process in response to the call in such a fashion that those of the layers once routed are not routed again, and to transmit the routing message to the routing start point from which the call is made, wherein the step (A) includes the step of constructing a neighbor set for an optional node based on links and QoS values which are obtained by determining the links associated with the optional node along with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

33. The routing method in accordance with claim 32, wherein the step (A) comprises the steps of:

(A-a) initializing respective QoS values of the links;

(A-b) initializing, for an optional one of nodes existing in an optional one of the layers, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values.

34. A routing method in a multi-level hierarchical data communication network having a plurality of layers for selecting a shortest path among a plurality of paths established between a single source node and each of destination nodes comprising the steps of:

(A) initializing a set of information about links of nodes in all paths existing in the network and Quality of Service (QoS) values for the links;

(B) designating a routing start point after completion of the initialization, calling a multi-casting routing means to execute a distributed routing process from the designated routing start point, and waiting for a routing message from the multi-casting routing means responding to the call; and (C) controlling the multi-casting routing means to execute the routing process in response to the call in such a fashion that those of the layers once routed are not routed again, and to transmit the routing message to the routing start point from which the call is made, wherein the step (A) comprises the steps of:

(A-a) initializing respective QoS values of the links;

(A-b) initializing, for an optional one of nodes existing in an optional one of the layers, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values, and wherein the step (B) comprises the steps of:

(B-a) designating a selected one of the nodes as a routing start point, and determining whether or not the selected node corresponds to a source node;

(B-b) if the selected node corresponds to the source node, then initializing the node information of the route set of the selected node with the source node, initializing the QoS value information of the route set of the selected node with a value of 0, transmitting a multi-casting routing request message to nodes neighboring to the source node, and waiting for a path detection message generated in response to the multi-casting routing request message for a predetermined period of delay time; and (B-c) if the selected node does not correspond to the source node, then waiting for a routing message subsequently transmitted to the selected node during a routing executed in association with a node other than the selected node, and calling, in response to a reception of the routing message at the selected node, the multi-casting routing means or weight comparing and routing means selected by the routing message.

35. The routing method in accordance with claim 34, wherein the step (B-c) comprises the steps of:

(B-c-a) calculating a total value of QoSs accumulated at a node currently routed along a current path;

(B-c-b) determining whether or not the current node corresponds to one of the destination nodes, and if the current node corresponds to one of the destination nodes, then determining whether or not the currently calculated total QoS value meets a predetermined reference QoS value;

(B-c-c) comparing the currently calculated total QoS value with a previously calculated total value of QoSs accumulated at the current node along another path when the current node does not corresponds to any one of the destination nodes, and stopping the current routing while waiting for another routing call when the previous total QoS value is more optimum than the current total QoS value;

(B-c-d) if it is determined at step (B-b) that the current total QoS value is (less than) more optimum than the previous total QoS value, then determining whether or not the last node of the current path corresponds to the current node, to conduct a correction of routing information based on the current path;

(B-c-e) additionally registering the last node of the current path in the neighbor set of the current node when it is determined at the step (B-c-d) that the last node of the current path does not correspond to the current node, while omitting the additional registration when it is determined that the last node of the current path corresponds to the current node;

(B-c-f) registering the total QoS value calculated at the step (B-a) in the total QoS value term of the route set of the current node, and registering the current path in the route term of the route set of the current node;

(B-c-g) subtracting the resultant route set of the current node from the resultant neighbor set of the current node, and transmitting a routing message, indicative of information about the resultant route set, to the node waiting for the routing message; and (B-c-h) repeatedly executing the steps (B-c-a) to (B-c-g) for each of neighbor nodes registered in the neighbor set of the current node, to conduct for a routing for the neighbor node.

36. The routing method in accordance with claim 35, wherein the step (B-c-b) comprises the steps of informing the source node of a path detection when it is determined that the currently calculated total QoS value meets a predetermined reference QoS value; and transmitting a path detection message to a node just preceding to the current node to determine a weightiest one of intermediate paths established between the source node and the destination nodes while substituting a weight of the current node by a value of 1.

37. The routing method in accordance with claim 34, wherein the step (B) comprises the steps of:

determining a weightiest one of paths established between the source node and the destination nodes in response to a reception of the path detection message, and informing the destination nodes of a detection of the weightiest path; and informing the destination nodes of a routing failure when there is no path detection message received within the predetermined period of delay time.

38. The routing method in accordance with claim 34, wherein the weight comparing and routing means carries out, in response to the calling associated therewith at the step (C), the steps of:

determining whether or not there is a path having a higher weight than that stored in the selected node; and if there is a weightier path, substituting the stored weight of the selected node by the weight of the weightier path, and incrementing the substituted weight by a value of 1; and subtracting the selected node from a route set indicative of information about the weightier path, and transmitting the resultant route set along with the resultant weight associated therewith, as a path detection message, to a node just preceding the selected node.

39. A routing method in a multi-level hierarchical data communication network having a plurality of layers for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made, wherein the step (A) includes the step of constructing a neighbor set for an optional node based on links and QoS values which are obtained by determining the links associated with the optional node alone with the respective QoS values of the associated links, by determining whether or not a node neighboring to the optional node is not the same as the optional node while being linked to the optional node and additionally registering the neighbor node in the neighbor set of the optional node if it is determined that the node neighboring to the optional node is not the same as the optional node while being linked to the optional node.

40. The routing method in accordance with claim 39, wherein the step (A) comprises the steps of:

(A-a) initializing respective QoS values of the links;

(A-b) initializing, for an optional one of nodes existing in an optional one of the layers, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values.

41. A routing method in a multi-level hierarchical data communication network having a plurality of layers for selecting paths satisfying a reference Quality of Service (QoS) value among a plurality of paths established between a single source node and a single destination node comprising the steps of:

(A) initializing a set of information about links of nodes in all paths existing in the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made, wherein the step (A) comprises the steps of:

(A-a) initializing respective QoS values of the links;

(A-b) initializing for an optional one of nodes existing in an optional one of the layers, a route set containing information about the optional node and a neighbor set containing information about neighbor nodes linked to the optional node;

(A-c) determining links associated with the optional node along with restective QoS values of the associated links; and (A-d) constructing the neighbor set for the optional node, based on the determined links and QoS values, and wherein the step (B) comprises the steps of:

(B-a) designating a selected one of the nodes as a routing start point, and determining whether or not the selected node corresponds to a source node;

(B-b) if the selected node corresponds to the source node, then initializing the node information of the route set of the selected node with the source node, initializing the QoS value information of the route set of the selected node with a value of 0, and calling the routing means; and (B-c) if the selected node does not correspond to the source node, then waiting for route information and an associated total QoS value subsequently transmitted, as a routing message, to the selected node during a routing executed in association with a node other than the selected node, and calling the routing means in response to a reception of the routing message at the selected node.

42. A routing method in a multi-level hierarchical data communication network having a plurality of layers for selecting paths satisfying a reference Quality of Service (QoS) value among a plurality of paths established between a single source node and a single destination node comprising the steps of:

(A) initializing a set of information about links of nodes in all paths existing n the network and QoS values for the links;

(B) designating a routing start point after completion of the initialization while setting the reference QoS value, calling a routing means to execute a distributed routing process from the designated routing start point, and waiting for a routing message from the routing means responding to the call; and (C) controlling the routing means to execute the routing process in response to the call in such a fashion that only one of routed paths having at least one overlapping node thereamong is selected while rejecting the remaining routed paths, and to transmit the resultant routing message to the routing start point from which the call is made, wherein the step (A) comprises the steps of:

(A-a) initializing respective QoS values of the links;

(A-b) initializing, for an optional one of nodes existing in an optional one of the layers, a route set containing information about the optional node and a neighbor set containing information about neighbor nodes linked to the optional node;

(A-c) determining links associated with the optional node along with respective QoS values of the associated links; and (A-d) constructing the neighbor set for the optional node, based on the determined links and QoS values, and wherein the step (C) comprises the steps of:

(C-a) calculating a total value of QoSs accumulated at a node currently routed along a current path;

(C-b) comparing the currently calculated total QoS value with a previously calculated total value of QoSs accumulated at the current node along another path, and stopping the current routing while waiting for another routing call when the previous total QoS value is more optimum than the current total QoS value;

(C-c) if it is determined at step (C-b) that the current total QoS value is more optimum than the previous total QoS value, then determining whether or not the current path has at least one node overlapping with other paths previously routed;

(C-d) if the current path has no overlapping node, then determining whether or not the last node of the current path corresponds to the current node;

(C-e) additionally registering the last node of the current path in the neighbor set of the current node when it is determined at the step (C-d) that the last node of the current path does not correspond to the current node, while omitting the additional registration when it is determined that the last node of the current path corresponds to the current node;

(C-f) registering the total QoS value calculated at the step (C-a) in the total QoS value term of the route set of the current node, and inputting the current path at an appropriate position in the route set of the current node in accordance with a predetermined priority order;

(C-g) adding information about the current node, as hop information, to respective neighbor sets of the nodes of all the previous paths while adding information about the current path, as route information, to respective route sets of the nodes of all the previous paths;

(C-h) transmitting a routing message, indicative of information about the resultant route set, to the node waiting for the routing message; and (C-i) repeatedly executing the steps (C-a) to (C-h) for each of neighbor nodes registered in the neighbor set of the current node, to conduct for a routing for the neighbor node.

43. The routing method in accordance with claim 42, further comprising the step of:

if the current path has at least one overlapping node, stopping the routing process associated with the current node.

* * * * *